(12) United States Patent
Naito

(10) Patent No.: US 8,234,714 B2
(45) Date of Patent: Jul. 31, 2012

(54) METHOD AND SYSTEM FOR REGISTERING DOMAIN

(75) Inventor: Joji Naito, Kanagawa-ken (JP)

(73) Assignee: Victor Company of Japan, Ltd., Yokohama (JP)

( * ) Notice: Subject to any disclaimer, the term of this patent is extended or adjusted under 35 U.S.C. 154(b) by 1054 days.

(21) Appl. No.: 12/216,839

(22) Filed: Jul. 11, 2008

(65) Prior Publication Data

US 2009/0025088 A1    Jan. 22, 2009

(30) Foreign Application Priority Data

Jul. 18, 2007   (JP) .................. 2007-186691
Jul. 18, 2007   (JP) .................. 2007-186692
Apr. 14, 2008   (JP) .................. 2008-104551

(51) Int. Cl.
G06F 7/04   (2006.01)

(52) U.S. Cl. .................. 726/27; 726/4; 726/6

(58) Field of Classification Search .......... 726/27, 726/4, 6
See application file for complete search history.

(56) References Cited

U.S. PATENT DOCUMENTS 7,441,117 B2 * 10/2008 Matsuzaki et al. ............ 713/163
7,526,657 B2 * 4/2009 Saneto et al. .................. 713/193
7,721,021 B2 * 5/2010 Johnson .......................... 710/36
2004/0093523 A1 * 5/2004 Matsuzaki et al. ............ 713/201
2008/0120687 A1 * 5/2008 Johnson ........................... 726/1
2009/0235330 A1 * 9/2009 Byun et al. ....................... 726/4

FOREIGN PATENT DOCUMENTS

JP   2002-169726   6/2002
JP   2004-120736   4/2004

* cited by examiner

Primary Examiner — Samson Lemma

(74) Attorney, Agent, or Firm — Louis Woo

(57) ABSTRACT

A first domain ID information piece for a first domain is sent from a first domain managing entity to a second domain managing entity. The first domain managing entity manages the first domain. The second domain managing entity manages a second domain. A second domain ID information piece for the second domain is sent from the second domain managing entity to the first domain managing entity. The first domain is registered with the second domain as a domain higher in rank than the second domain in response to the first domain ID information piece sent from the first domain managing entity to the second domain managing entity. The second domain is registered with the first domain as a domain lower in rank than the first domain in response to the second domain ID information piece sent from the second domain managing entity to the first domain managing entity.

15 Claims, 12 Drawing Sheets

METHOD AND SYSTEM FOR REGISTERING DOMAIN

BACKGROUND OF THE INVENTION

1. Field of the Invention

This invention relates to a method and a system for registering a domain or domains which can be used in domain management designed to protect data representative of or related to, for example, copyrighted or licensed contents and services.

2. Description of the Related Art

Throughout this specification, the word "content" means, for example, a home movie, a motion picture, a television program, an audio visual stream, a music tune, or a computer game program.

It is known that a server provides data representative of or related to copyrighted or licensed contents and services of various types to user's machine on a fee-charging or free-of-charge basis, and a user is permitted to use the contents and services through the user's machine. In this case, protecting the contents and services against illegal use thereof is important.

A typical management method is designed so that a contents provider gives permission for the use of contents to a selected machine or machines only, and the contents can be used through the machine or machines having the permission.

There is a known management method in which a plurality of machines are assigned to a domain, and a contents provider gives permission for the use of contents to the domain, that is, the machines assigned to the domain. Therefore, the contents can be used through each of the machines assigned to the domain.

Japanese patent application publication number 2002-169726 discloses a system in which information processing machines are separated into groups. Different group keys are assigned to the groups, respectively. A same group key is stored in each of machines in one group. In the system of Japanese application 2002-169726, each content is encrypted with a content key. In the case where an encrypted content is requested to be transmitted from one machine, a related content key is encrypted with a group key for a group having the present machine. Then, the encrypted content and the encrypted content key are transmitted from the present machine. Each of other machines in the group same as that having the present machine can decrypt the encrypted content key with the group key, and then decrypt the encrypted content with the decrypted content key. Therefore, each of these machines can use the original content. On the other hand, machines in groups different from the group having the present machine can not decrypt the encrypted content key. Thus, these machines can not use the original content.

Japanese patent application publication number 2004-120736 discloses a group formation managing system designed to fix the range of a group and allow contents to be used freely among devices in the group. The system of Japanese application 2004-120736 comprises registered member devices, a new member device, and a group managing device. Each of the registered member devices holds common secret information peculiar to a related group. The new member device sends the group managing device a request for registration with the group. The group managing device receives the request from the new member device, and decides whether or not the current number of registered member devices in the group is less than a limited number equal to a maximum number of registered member devices in the group. When it is decided that the current number of registered member devices in the group is less than the limited number, the group managing device registers the new member device with the group and then outputs the common secret information to the newly registered member device. The newly registered member device receives and holds the common secret information. When a content is to be used, the group managing device authenticates all member devices in the group according to the common secret information. The group managing device delivers the content only to each of member devices about which the authentication is successful. Therefore, it is possible to prevent the content from being used by member devices not holding the common secret information, that is, member devices not registered with the group.

In the system of Japanese application 2002-169726, each machine is required to obtain and store a group key. Japanese application 2002-169726 does not disclose a change in the grouping of machines. Specifically, Japanese application 2002-169726 does not disclose a case where machines in one group are newly added to another group. Japanese application 2004-120736 teaches the addition of a new member device to a group. However, Japanese application 2004-120736 does not disclose a case where machines in one group are newly added to another group.

SUMMARY OF THE INVENTION

It is a first object of this invention to provide a method of registering a domain or domains which easily and properly enables members in one domain (one group) to be newly added to another domain (another group).

It is a second object of this invention to provide a system for registering a domain or domains which easily and properly enables members in one domain (one group) to be newly added to another domain (another group).

A first aspect of this invention provides a method of registering domains. The method comprises the steps of sending a first domain ID information piece for a first domain from a first domain managing entity to a second domain managing entity, the first domain managing entity managing the first domain, the second domain managing entity managing a second domain; sending a second domain ID information piece for the second domain from the second domain managing entity to the first domain managing entity; registering the first domain with the second domain as a domain higher in rank than the second domain in response to the first domain ID information piece sent from the first domain managing entity to the second domain managing entity; and registering the second domain with the first domain as a domain lower in rank than the first domain in response to the second domain ID information piece sent from the second domain managing entity to the first domain managing entity.

A second aspect of this invention is based on the first aspect thereof, and provides a method further comprising the steps of sending the second domain ID information piece from the second domain managing entity to a domain member entity; sending an entity ID information piece for the domain member entity from the domain member entity to the second domain managing entity; registering the domain member entity with the second domain in response to the entity ID information piece sent from the domain member entity to the second domain managing entity; sending the entity ID information piece from the second domain managing entity to the first domain managing entity; and registering the domain member entity with the first domain in response to the entity ID information piece sent from the second domain managing entity to the first domain managing entity.

A third aspect of this invention is based on the first aspect thereof, and provides a method wherein the step of registering the first domain with the second domain comprises recording the first domain ID information piece into a registered domain list so that the first domain will be higher in rank than the second domain, and the step of registering the second domain with the first domain comprises recording the second domain ID information piece into a domain member list so that the second domain will be lower in rank than the first domain.

A fourth aspect of this invention is based on the second aspect thereof, and provides a method wherein the step of registering the first domain with the second domain comprises recording the first domain ID information piece into a registered domain list so that the first domain will be higher in rank than the second domain, the step of registering the second domain with the first domain comprises recording the second domain ID information piece into a first domain member list so that the second domain will be lower in rank than the first domain, the step of registering the domain member entity with the second domain comprises recording the entity ID information piece into a second domain member list, and the step of registering the domain member entity with the first domain comprises recording the entity ID information piece into the first domain member list while relating the entity ID information piece with the second domain ID information piece.

A fifth aspect of this invention is based on the fourth aspect thereof, and provides a method further comprising the steps of detecting the number of entity ID information pieces in the second domain member list; comparing the detected number with a predetermined maximum number to decide whether or not the detected number is less than the predetermined maximum number; permitting registering the domain member entity with the second domain when it is decided that the detected number is less than the predetermined maximum number; and forbidding registering the domain member entity with the second domain when it is decided that the detected number is not less than the predetermined maximum number.

A sixth aspect of this invention provides a method of registering domains. The method comprises the steps of notifying an allowable response time from a first domain managing entity to a second domain managing entity, the first domain managing entity managing a first domain, the second domain managing entity managing a second domain lower in rank than the first domain, the second domain having a domain member entity as a registered member thereof, the second domain managing entity having information indicative of a first response time for signal transfer between the second domain managing entity and the domain member entity; measuring a second response time for signal transfer between the first domain managing entity and the second domain managing entity; comparing a sum of the first response time and the second response time with the allowable response time notified from the first domain managing entity to the second domain managing entity to decide whether or not the sum is greater than the allowable response time; and forbidding registering the second domain with the first domain when it is decided that the sum is greater than the allowable response time.

A seventh aspect of this invention provides a method of registering domains. The method comprises the steps of notifying an allowable response time from a first domain managing entity to a second domain managing entity, the first domain managing entity managing a first domain, the second domain managing entity managing a second domain lower in rank than the first domain, the second domain managing entity having information indicative of a first response time for signal transfer between the first domain managing entity and the second domain managing entity; measuring a second response time for signal transfer between a domain member entity and the second domain managing entity; comparing a sum of the first response time and the second response time with the allowable response time notified from the first domain managing entity to the second domain managing entity to decide whether or not the sum is greater than the allowable response time; and forbidding registering the domain member entity with the second domain when it is decided that the sum is greater than the allowable response time.

An eighth aspect of this invention provides a method of registering domains, wherein a first domain managing entity manages a first domain through the use of a first domain ID information piece for the first domain, and a second domain managing entity manages a second domain through a second domain ID information piece for the second domain, and wherein a domain member entity assigned an entity ID information piece is registered with the second domain, and the second domain is registered with the first domain as one lower in rank than the first domain. The method comprises the steps of sending a request for a domain ID information piece from the domain member entity to the first domain managing entity in cases where the second domain managing entity does not notify the domain member entity that the second domain is registered with the first domain and one of a content or a service given a prescribed domain ID information piece is requested to be used by the domain member entity, the request containing the entity ID information piece for the domain member entity; deciding whether or not the domain member entity is registered with the first domain on the basis of the entity ID information piece in the request sent from the domain member entity to the first domain managing entity; sending the first domain ID information piece for the first domain from the first domain managing entity to the domain member entity when it is decided that the domain member entity is registered with the first domain; comparing the first domain ID information piece sent from the first domain managing entity to the domain member entity with the prescribed domain ID information piece to decide whether or not the first domain ID information piece and the prescribed domain ID information piece are the same; permitting the domain member entity to use said one of the content and the service when it is decided that the first domain ID information piece and the prescribed domain ID information piece are the same; and forbidding the domain member entity to use said one of the content and the service when it is decided that the first domain ID information piece and the prescribed domain ID information piece are not the same.

A ninth aspect of this invention provides a system for registering domains. The system comprises a first domain assigned a first ID; a first list for IDs of members registered with the first domain as ones lower in rank than the first domain; a second list for IDs of domains registered with the first domain as ones higher in rank than the first domain; a second domain assigned a second ID; a third list for IDs of members registered with the second domain as ones lower in rank than the second domain; a fourth list for IDs of domains registered with the second domain as ones higher in rank than the second domain; means for recording the first ID into the fourth list to register the first domain with the second domain as one higher in rank than the second domain; and means for recording the second ID into the first list to register the second domain with the first domain as one lower in rank than the first domain.

A tenth aspect of this invention is based on the ninth aspect thereof, and provides a system further comprising a domain member entity assigned a third ID; means for recording the third ID into the first list to register the domain member entity with the first domain; and means for recording the third ID into the third list to register the domain member entity with the second domain.

This invention provides the following advantages. A first domain is higher in rank than a second domain. All domain entities registered with the second domain can be registered with the first domain by merely registering the second domain with the first domain. Thus, it is possible to easily and properly implement the registration of all the domain member entities in the second domain with the first domain.

A domain policy can be prescribed about an allowable network response time or the number of registered domain member entities. This invention provides a domain managing system where the domain policy is correctly complied with in a hierarchy of domains, and contents or services licensed to the domains are prevented from being illegally used.

The first domain is managed by a first domain managing entity. The second domain is managed by a second domain managing entity. A domain member entity which has been registered with the second domain can obtain a domain ID information piece for the first domain by making a corresponding request to the first domain managing entity. It is unnecessary for the domain member entity to inquire of the second domain managing entity whether or not registration-related conditions of domains are updated. This is a good advantage in the case where domain member entities belong to two or more domains. It is unnecessary for the domain member entity to inquire of domain managing entities which of domains having the domain member entity is newly added to the first domain. By only making a request to the first domain managing entity, the domain member entity can use a content or a service licensed to the first domain. Entity ID information pieces are owned in common by domain managing entities managing hierarchized domains. Domain member entities are not promptly notified of a change in registration-related conditions of the domains, and domain ID information pieces are distributed to the domain member entities at a later stage. Thereby, hierarchizing the domains can be easy.

DETAILED DESCRIPTION OF THE INVENTION

Figure 1:
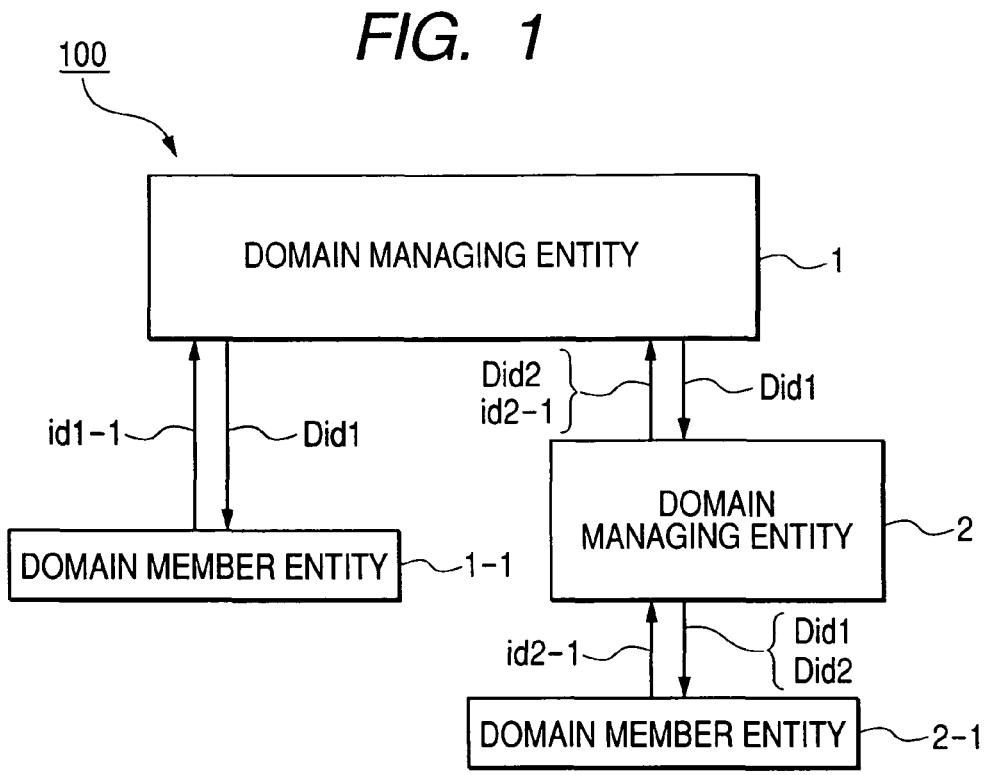
FIG. 1 is a logical-base diagram of a domain managing system according to a first embodiment of this invention.

Entities are of first and second types. Different entity identification (ID) information pieces are assigned to the entities of the first type, respectively. Different entity ID information pieces may also be assigned to the entities of the second type, respectively. The entities of the first type are separated into groups called domains as a result of the implementation of registering procedures. Different domain identification (ID) information pieces are assigned to the domains, respectively. It is possible to make a hierarchy in the domains.

In general, the entities of the first type are domain member entities while the entities of the second type are domain managing entities for the respective domains. Each domain managing entity is designed to manage a related domain. The domain managing entity can resister a domain member entity or entities and an unrelated domain or domains with the related domain while hierarchizing the unrelated and related domains. Generally, registering a domain member entity with a domain means registering the entity ID information piece for the domain member entity with the domain. Similarly, registering a first domain with a second domain means registering the domain ID information piece for the first domain with the second domain. Specifically, the domain managing entity has not only the function of registering the entity ID information pieces for domain member entities with the related domain but also the function of registering, with the related domain, (1) the entity ID information pieces for domain member entities in an unrelated domain or domains higher or lower in rank than the related domain and (2) the domain ID information piece or pieces of the unrelated domain or domains while hierarchizing the registered entity ID information pieces and the registered domain ID information piece or pieces.

Since the domains are managed by the domain managing entities respectively and are thus closely related to the domain managing entities respectively, registering a first domain with a second domain is equivalent to registering a domain managing entity for the first domain with the second domain.

There is a case where a domain member entity is requested to be registered with a domain managed by a domain managing entity. In this case, the domain managing entity sends the domain ID information piece for the related domain to the domain member entity to be registered. Then, the domain managing entity receives, from the domain member entity, the entity ID information piece therefor as a response to the sent domain ID information piece. In this way, handshake communications are implemented between the domain managing entity and the domain member entity. After the implementation of the handshake communications, the domain managing entity registers the domain member entity with the related domain.

There is another case where a first domain managed by a first domain managing entity and being lower in rank than a second domain managed by a second domain managing entity is requested to be registered with the second domain. In this case, the second domain managing entity sends the domain ID information piece for the second domain to the first domain managing entity. Then, the second domain managing entity receives the domain ID information piece for the first domain from the first domain managing entity as a response to the sent domain ID information piece. In this way, handshake communications are implemented between the first and second domain managing entities. After the implementation of the handshake communications, the second domain managing entity registers the first domain with the second domain.

FIRST EMBODIMENT

FIG. 1 shows a domain managing system 100 according to a first embodiment of this invention. The domain managing system 100 includes domain managing entities 1 and 2, and domain member entities 1-1 and 2-1.

Preferably, the domain managing entities 1 and 2 include domain managing devices having computers respectively. Similarly, the domain member entities 1-1 and 2-1 include domain member devices having computers respectively. The computers operate in accordance with control programs (computer programs) installed thereon. The control programs are designed to enable the domain managing entities 1 and 2 and the domain member entities 1-1 and 2-1 to perform actions indicated hereafter.

The domain managing entity 1 serves to manage a domain D1. The domain member entity 1-1 is registered with the domain D1 as a result of the implementation of a registering procedure. The domain managing entity 2 serves to manage a domain D2. The domain member entity 2-1 is registered with the domain D2 as a result of the implementation of a registering procedure. The domain D2 and the domain member entity 2-1 are registered with the domain D1, and the domains D1 and D2 are hierarchized as a result of the implementation of a registering and hierarchizing procedure. An example of the hierarchization is such that the domain D1 is higher in rank than the domain D2.

Entity ID information pieces id1-1 and id2-1 are assigned to the domain member entities 1-1 and 2-1, respectively. Domain ID information pieces Did1 and Did2 are assigned to the domains D1 and D2, respectively.

The domain managing entity 1 has the domain ID information piece Did1 for the domain D1 beforehand. Similarly, the domain managing entity 2 has the domain ID information piece Did2 for the domain D2 beforehand. The domain member entity 1-1 has the related entity ID information piece id1-1 beforehand. Similarly, the domain member entity 2-1 has the related entity ID information piece id2-1 beforehand.

Figure 2:
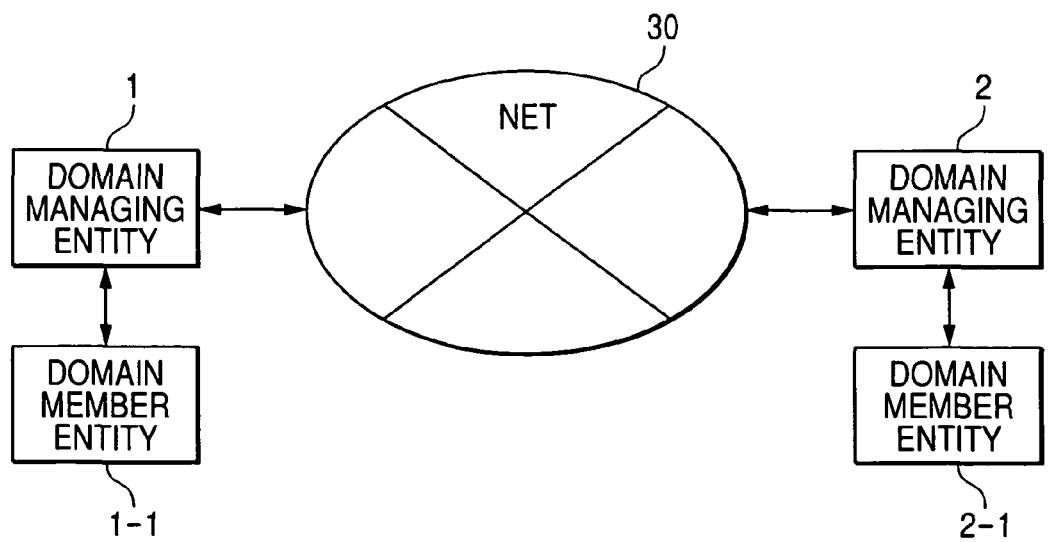
FIG. 2 is a physical-base diagram of the domain managing system in FIG. 1.

As shown in FIG. 2, the domain managing entities 1 and 2 are connected by a network 30 so that they can communicate in two ways. The domain managing entities 1 and 2 may be connected by a means different from the network 30. The domain member entity 1-1 and the domain managing entity 1 are connected so that they can communicate in two ways. Similarly, the domain member entity 2-1 and the domain managing entity 2 are connected so that they can communicate in two ways. The network 30 includes the Internet, a WAN, a LAN, or a home network. The connection between the domain member entity 1-1 and the domain managing entity 1, and the connection between the domain member entity 2-1 and the domain managing entity 2 may be network-based connections or 1-to-1 two-way communicable connections.

It should be noted that all the domain managing entities 1 and 2, and the domain member entities 1-1 and 2-1 may be connected by the network 30.

For hierarchizing the domains D1 and D2 so that the domain D1 will be higher in rank than the domain D2, a domain managing user requests the domain managing entity 1 or 2 to start a hierarchizing procedure. For example, each of the domain managing entities 1 and 2 includes a computer, an user interface connected with the computer, and a communication interface between the computer and a network. In this case, a user's command for the procedure start request is inputted into the computer via the user interface or via the network and the communication interface.

When the domain managing user requests the domain managing entity 1 to start a process of setting the domain D2 lower in rank than the domain D1 and a process of setting the domain member entity 1-1 as a member in the domain D1, the domain managing entity 1 sends the domain ID information piece Did1 to the domain member entity 1-1 and the domain managing entity 2. The domain member entity 1-1 and the domain managing entity 2 receive the domain ID information piece Did1. Upon the reception of the domain ID information piece Did1, the domain member entity 1-1 sends the entity ID information piece id1-1 to the domain managing entity 1. The domain managing entity 1 receives the entity ID information piece id1-1. Upon the reception of the domain ID information piece Did1, the domain managing entity 2 sends the domain ID information piece Did2 to the domain managing entity 1. The domain managing entity 1 receives the domain ID information piece Did2. In this way, handshake communications are implemented between the domain managing entity 1 and the domain member entity 1-1, and also between the domain managing entity 1 and the domain managing entity 2. After the implementation of the handshake communications, the domain managing entity 1 registers the domain member entity 1-1 with the domain D1 as a member thereof. In addition, the domain managing entity 1 registers the domain D2 with the domain D1 as one lower in rank than the domain D1. Accordingly, the domains D1 and D2 are hierarchized.

When the domain managing user requests the domain managing entity 2 to start a process of setting the domain D1 higher in rank than the domain D2, the domain managing entity 2 sends the domain ID information piece Did2 to the domain managing entity 1. The domain managing entity 1 receives the domain ID information piece Did2. Upon the reception of the domain ID information piece Did2, the domain managing entity 1 sends the domain ID information piece Did1 to the domain managing entity 2. The domain managing entity 2 receives the domain ID information piece Did1. In this way, handshake communications are implemented between the domain managing entity 2 and the domain managing entity 1. After the implementation of the handshake communications, the domain managing entity 1 registers the domain D2 with the domain D1 as one lower in rank than the domain D1. The domain managing entity 2 registers the domain D1 with the domain D2 as one higher in rank than the domain D2. Accordingly, the domains D1 and D2 are hierarchized.

The registration of a domain member entity with one of the hierarchized domains D1 and D2 is implemented as follows. When the domain managing user requests the domain managing entity 2 to start a process of setting the domain member entity 2-1 as a member of the domain D2, the domain managing entity 2 sends the domain ID information piece Did2 and the domain ID information piece Did1 to the domain member entity 2-1 to be registered with the domain D2 managed by the domain managing entity 2. It should be noted that the domain managing entity 2 has received the domain ID information piece Did1 from the domain managing entity 1. The domain member entity 2-1 receives the domain ID information piece Did2 and the domain ID information piece Did1. Upon the reception of the domain ID information piece Did2 and the domain ID information piece Did1, the domain member entity 2-1 sends the entity ID information piece id2-1 to the domain managing entity 2. The domain managing entity 2 receives the entity ID information piece id2-1. Upon the reception of the entity ID information piece id2-1, the domain managing entity 2 registers the domain member entity 2-1 with the domain D2 and sends the entity ID information piece id2-1 to the domain managing entity 1 for the domain D1 higher in rank than the domain D2 assigned to the domain managing entity 2. The domain managing entity 1 receives the entity ID information piece id2-1. Upon the reception of the entity ID information piece id2-1, the domain managing entity 1 registers the domain member entity 2-1 with the domain D1.

In the case where the domain member entity 2-1 has already been registered with the domain D2 at the time of hierarchizing the domains D1 and D2, a process of registering the domain D2 with the domain D1 is implemented as follows. The domain managing entity 1 sends the domain ID information piece Did1 to the domain managing entity 2. The domain managing entity 2 receives the domain ID information piece Did1. Upon the reception of the domain ID information piece Did1, the domain managing entity 2 sends the domain ID information piece Did2 to the domain managing entity 1. Then, the domain managing entity 2 sends the domain managing entity 1 the entity ID information piece id2-1 for the domain member entity 2-1 in the domain D2 managed by the domain managing entity 2. Furthermore, the domain managing entity 2 passes the domain ID information piece Did1 to the domain member entity 2-1. In this way, handshake communications are implemented among the domain managing entity 1, the domain managing entity 2, and the domain member entity 2-1. After the implementation of the handshake communications, the domain managing entity 1 registers the domain D2 and the domain member entity 2-1 with the domain D1.

SECOND EMBODIMENT

Figure 3:
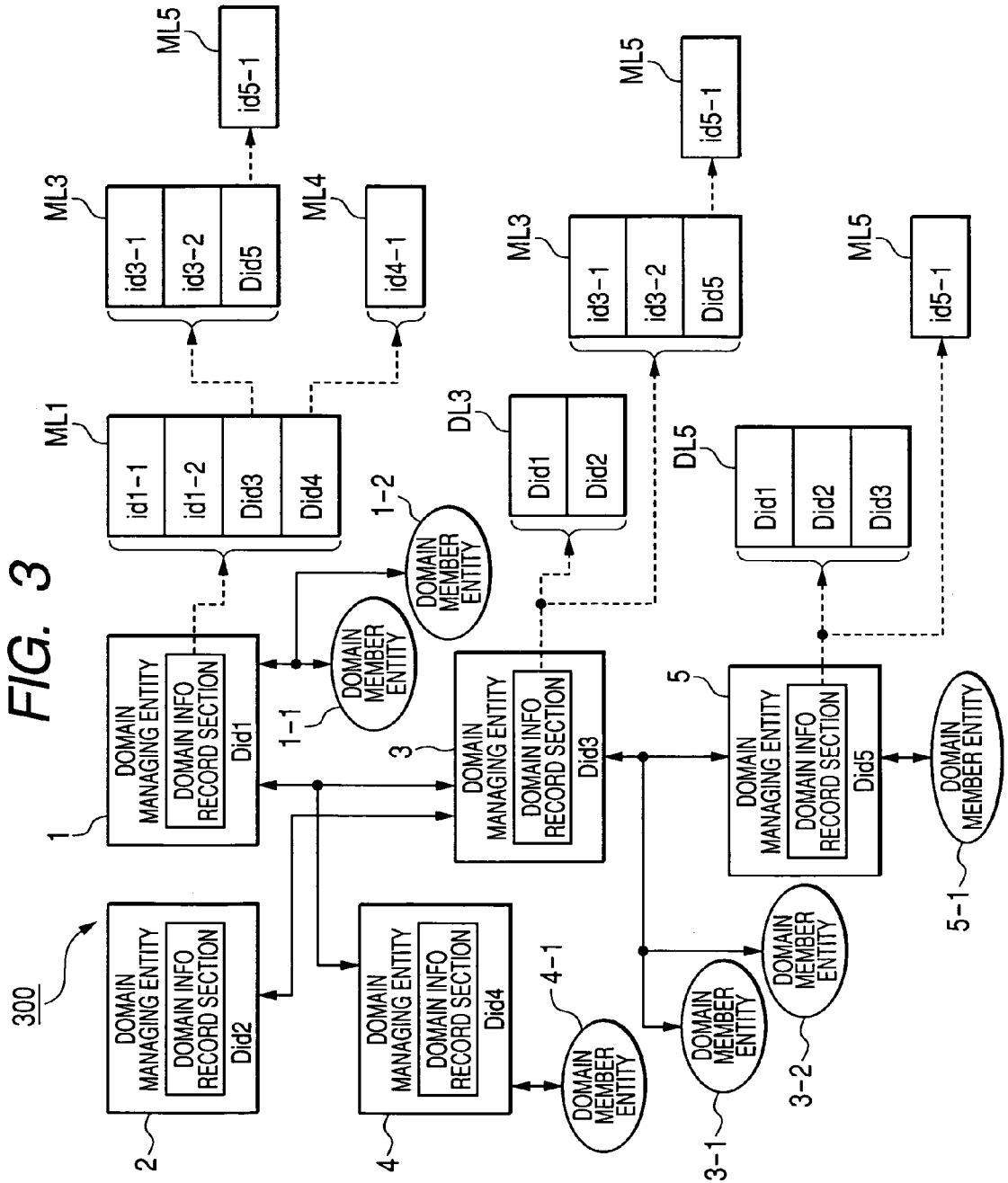
FIG. 3 is a logical-base diagram of a domain managing system according to a second embodiment of this invention.

FIG. 3 shows a domain managing system 300 according to a second embodiment of this invention. The domain managing system 300 includes domain managing entities 1, 2, 3, 4, and 5, and domain member entities 1-1, 1-2, 3-1, 3-2, 4-1, and 5-1.

Preferably, the domain managing entities 1, 2, 3, 4, and 5 include domain managing devices having computers respectively. Similarly, the domain member entities 1-1, 1-2, 3-1, 3-2, 4-1, and 5-1 include domain member devices having computers respectively. The computers operate in accordance with control programs (computer programs) installed thereon. The control programs are designed to enable the domain managing entities 1, 2, 3, 4, and 5 and the domain member entities 1-1, 1-2, 3-1, 3-2, 4-1, and 5-1 to perform actions indicated hereafter.

The domain managing entities 1, 2, 3, 4, and 5 serve to manage domains D1, D2, D3, D4, and D5, respectively. The domain member entities 1-1 and 1-2 are registered with the domain D1 as a result of the implementation of registering procedures. The domain member entities 3-1 and 3-2 are registered with the domain D3 as a result of the implementation of registering procedures. The domain member entity 4-1 is registered with the domain D4 as a result of the implementation of a registering procedure. The domain member entity 5-1 is registered with the domain D5 as a result of the implementation of a registering procedure. In FIG. 3, the domain D2 has no registered domain member entity.

Entity ID information pieces id1-1, id1-2, id3-1, id3-2, id4-1, and id5-1 are assigned to the domain member entities 1-1, 1-2, 3-1, 3-2, 4-1, and 5-1, respectively. Domain ID information pieces Did1, Did2, Did3, Did4, and Did5 are assigned to the domains D1, D2, D3, D4, and D5, respectively.

The domain managing entity 1 has the domain ID information piece Did1 for the domain D1 beforehand. Similarly, the domain managing entities 2, 3, 4, and 5 have the domain ID information pieces Did2, Did3, Did4, and Did5 for the domains D2, D3, D4, and D5 beforehand, respectively. The domain member entity 1-1 has the related entity ID information piece id1-1 beforehand. Similarly, the domain member entity 1-2, 3-1, 3-2, 4-1, and 5-1 have the related entity ID information pieces id1-2, id3-1, id3-2, id4-1, and id5-1 beforehand, respectively.

As shown in FIG. 3, the domain managing entities 1, 2, 3, 4, and 5 have domain information recording sections 1a, 2a, 3a, 4a, and 5a, respectively. Preferably, the domain information recording sections 1a, 2a, 3a, 4a, and 5a include memories or storage devices, respectively.

Each of the domain managing entities 1, 2, 3, 4, and 5 can have a registered domain list and at least one domain member list defining a related domain. Each of the domain information recording sections 1a, 2a, 3a, 4a, and 5a in the domain managing entities 1, 2, 3, 4, and 5 can store data representing the registered domain list and the at least one domain member list. The registered domain list is used to store the domain ID information piece or pieces for a domain or domains other than the related domain. The registered domain list defines that the domain or domains assigned the domain ID information piece or pieces same as that or those stored therein are higher in rank than the related domain. Registering a domain or domains with the related domain as one or ones higher in rank than the related domain is implemented by recording the domain ID information piece or pieces for them into the registered domain list. The domain member list is used to store the entity ID information piece or pieces for a domain member entity or entities. The domain member list indicates that the domain member entity or entities assigned the entity ID information piece or pieces same as that or those stored therein are members of the related domain. Registering a domain member entity or entities with the related domain is implemented by recording the entity ID information piece or pieces for them into the domain member list. Furthermore, the domain member list is used to store the domain ID information piece or pieces for a domain or domains other than the related domain. The domain member list defines that the domain or domains assigned the domain ID information piece or pieces same as that or those stored therein are lower in rank than the related domain. Registering a domain or domains with the related domain as one or ones lower in rank than the related domain is implemented by recording the domain ID information piece or pieces for them into the domain member list.

A domain member list ML1 is stored in the domain information recording section 1a in the domain managing entity 1. The domain member list ML1 has the entity ID information piece or pieces for a domain member entity or entities registered with the domain D1 as a member or members thereof. The domain member list ML1 further has the domain ID information piece or pieces for a domain or domains lower in rank than the domain D1.

A registered domain list DL3 is stored in the domain information recording section 3a in the domain managing entity 3. The registered domain list DL3 has the domain ID information pieces Did1 and Did2 for the domains D1 and D2 higher in rank than the domain D3. It should be noted that the domain ID information piece Did3 may be stored in the domain information recording section 3a beforehand. Similarly, the domain ID information pieces Did1, Did2, Did4, and Did5 may be stored in the domain information recording sections 1a, 2a, 4a, and 5a beforehand, respectively.

Figure 4:
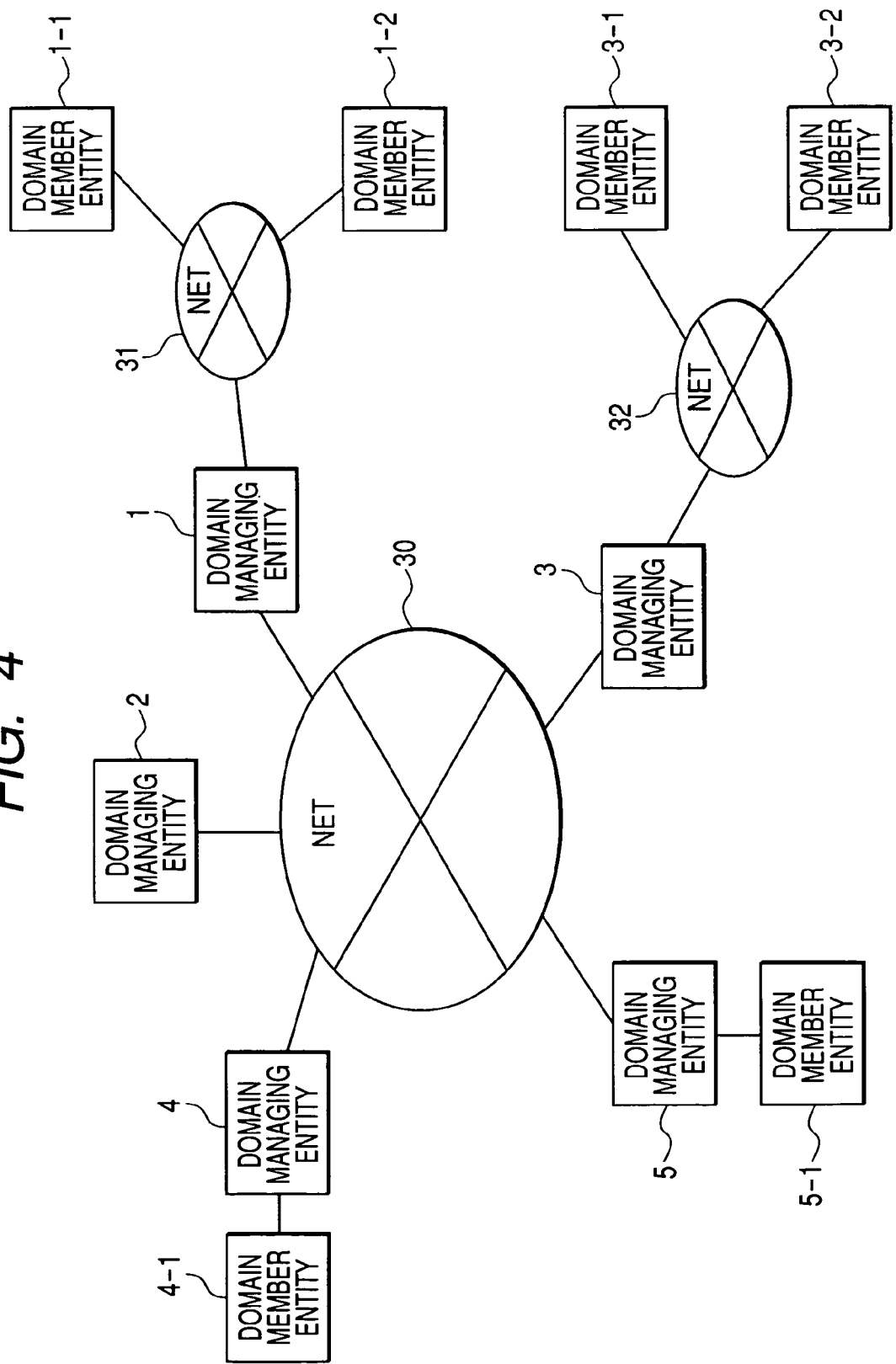
FIG. 4 is a physical-base diagram of the domain managing system in FIG. 3.

As shown in FIG. 4, the domain managing entities 1, 2, 3, 4, and 5 are connected by a network 30 so that they can communicate in two ways. The domain managing entities 1, 2, 3, 4, and 5 may be connected by a means different from the network 30. The domain managing entity 1, the domain member entity 1-1, and the domain member entity 1-2 are connected by a network 31 so that they can communicate in two ways. The domain managing entity 3, the domain member entity 3-1, and the domain member entity 3-2 are connected by a network 32 so that they can communicate in two ways. The domain member entity 4-1 and the domain managing entity 4 are connected so that they can communicate in two ways. Similarly, the domain member entity 5-1 and the domain managing entity 5 are connected so that they can communicate in two ways. The network 30 includes the Internet, a WAN, a LAN, or a home network. Each of the networks 31 and 32 includes a LAN or a home network. The connection between the domain member entity 4-1 and the domain managing entity 4, and the connection between the domain member entity 5-1 and the domain managing entity 5 may be network-based connections or 1-to-1 two-way communicable connections.

For hierarchizing the domains D1, D2, D3, D4, and D5 or registering at least one of the domains D1, D2, D3, D4, and D5 and the domain member entities 1-1, 1-2, 3-1, 3-2, 4-1, and 5-1, a domain managing user requests at least one of the domain managing entities 1, 2, 3, 4, and 5 to start a hierarchizing or registering procedure. For example, each of the domain managing entities 1, 2, 3, 4, and 5 includes a computer, an user interface connected with the computer, and a communication interface between the computer and a network. In this case, a user's command for the procedure start request is inputted into the computer via the user interface or via the network and the communication interface.

A description will now be given of the case where the domain member entities 1-1 and 1-2 are requested to be registered with the domain D1 while the domains D3 and D4 are requested to be registered therewith as ones lower in rank than the domain D1, and where the domain D3 is requested to be registered with the domain D2.

When the domain managing user requests the domain managing entities 1 and 2 to start a registering and hierarchizing procedure, the domain managing entity 1 sends the domain ID information piece Did1 to the domain member entities 1-1 and 1-2 and the domain managing entities 3 and 4. At the same time, the domain managing entity 2 sends the domain ID information piece Did2 to the domain managing entity 3. The domain member entities 1-1 and 1-2 and the domain managing entities 3 and 4 receive the domain ID information piece Did1. The domain managing entity 3 receives the domain ID information piece Did2. Upon the reception of the domain ID information piece Did1, the domain member entity 1-1 sends the entity ID information piece id1-1 to the domain managing entity 1. The domain managing entity 1 receives the entity ID information piece id1-1. Upon the reception of the domain ID information piece Did1, the domain member entity 1-2 sends the entity ID information piece id1-2 to the domain managing entity 1. The domain managing entity 1 receives the entity ID information piece id1-2. Upon the reception of the domain ID information pieces Did1 and Did2, the domain managing entity 3 sends the domain ID information piece Did3 to the domain managing entities 1 and 2. The domain managing entities 1 and 2 receive the domain ID information piece Did3. Upon the reception of the domain ID information pieces Did1, the domain managing entity 4 sends the domain ID information piece Did4 to the domain managing entity 1. The domain managing entity 1 receives the domain ID information piece Did4. In this way, handshake communications are implemented among the domain managing entities 1, 2, 3, and 4 and the domain member entities 1-1 and 1-2.

After the implementation of the handshake communications, the domain managing entity 1 records the received entity ID information pieces id1-1 and id1-2 and the received domain ID information pieces Did3 and Did4 into the domain member list ML1 in the domain information recording section 1a. Thereby, the domain managing entity 1 registers the domain member entities 1-1 and 1-2 and the domains D3 and D4 with the domain D1 while updating the domain member list ML1. Since the domain ID information pieces Did3 and Did4 are in the domain member list ML1, the domains D3 and D4 are defined as ones lower in rank than the domain D1.

After the implementation of the handshake communications, the domain managing entity 2 records the received domain ID information piece Did3 into a domain member list ML2 (not shown) in the domain information recording section 2a. Thereby, the domain managing entity 2 registers the domain D3 with the domain D2 while updating the domain member list ML2. Since the domain ID information piece Did3 is in the domain member list ML2, the domain D3 is defined as one lower in rank than the domain D2.

After the implementation of the handshake communications, the domain managing entity 3 records the received domain ID information pieces Did 1 and Did2 into a registered domain list DL3 in the domain information recording section 3a. Thereby, the domain managing entity 3 registers the domains D1 and D2 with the domain D3 while updating the registered domain list DL3. Since the domain ID information pieces Did1 and Did2 are in the registered domain list DL3, the domains D1 and D2 are defined as ones higher in rank than the domain D3.

To register the domain member entities 3-1 and 3-2 and the domain D5 with the domain D3, the domain managing entity 3 sends the domain ID information pieces Did1, Did2, and Did3 to the domain member entities 3-1 and 3-2 and the domain managing entity 5. The domain ID information pieces Did1 and Did2 are those for the domains D1 and D2 higher in rank than the domain D3. The domain member entities 3-1 and 3-2 and the domain managing entity 5 receive the domain ID information pieces Did1, Did2, and Did3.

Upon the reception of the domain ID information pieces Did1, Did2, and Did3, the domain member entity 3-1 sends the entity ID information piece id3-1 to the domain managing entity 3. The domain managing entity 3 receives the entity ID information piece id3-1. Upon the reception of the domain ID information pieces Did1, Did2, and Did3, the domain member entity 3-2 sends the entity ID information piece id3-2 to the domain managing entity 3. The domain managing entity 3 receives the entity ID information piece id3-2. Upon the reception of the domain ID information pieces Did1, Did2, and Did3, the domain managing entity 5 sends the domain ID information piece Did5 to the domain managing entity 3. The domain managing entity 3 receives the domain ID information piece Did5. In this way, handshake communications are implemented between the domain managing entities 3 and 5 and the domain member entities 3-1 and 3-2.

After the implementation of the handshake communications, the domain managing entity 3 records the received entity ID information pieces id3-1 and id3-2 and the received domain ID information piece Did5 into the domain member list ML3 in the domain information recording section 3a. Thereby, the domain managing entity 3 registers the domain member entities 3-1 and 3-2 and the domain D5 with the domain D3 while updating the domain member list ML3. Since the domain ID information piece Did5 is in the domain member list ML3, the domain D5 is defined as one lower in rank than the domain D3.

The domain managing entity 3 sends the domain member list ML3 to the domain managing entities 1 and 2 corresponding to the domain ID information pieces Did1 and Did2 in the registered domain list DL3. Sending the domain member list ML3 may be replaced with sending all the registered ID information pieces in the list ML3 or the newly registered ID information piece (pieces) therein. The domain managing entities 1 and 2 receive the domain member list ML3.

Upon the reception of the domain member list ML3, the domain managing entity 2 records the list ML3 into the domain information recording section 2a in such a manner as to relate the list ML3 with the domain ID information piece Did3 in the domain member list ML2.

Upon the reception of the domain member list ML3, the domain managing entity 1 records the list ML3 into the domain information recording section 1a in such a manner as to relate the list ML3 with the domain ID information piece Did3 in the domain member list ML1.

Meanwhile, the domain managing entity 4 records the domain ID information piece Did1, which has been sent from the domain managing entity 1, into a registered domain list DL4 (not shown) in the domain information recording section 4a. Thus, the registered domain list DL4 is updated. Since the domain ID information piece Did1 is in the registered domain list DL4, the domain D1 is defined as one higher in rank than the domain D4.

To register the domain member entity 4-1 with the domain D4, the domain managing entity 4 sends the related domain ID information piece Did4 and the domain ID information piece Did1 to the domain member entity 4-1. The domain member entity 4-1 receives the domain ID information pieces Did1 and Did4.

Upon the reception of the domain ID information pieces Did1 and Did4, the domain member entity 4-1 sends the entity ID information piece id4-1 to the domain managing entity 4. The domain managing entity 4 receives the entity ID information piece id4-1. In this way, handshake communications are implemented between the domain managing entity 4 and the domain member entity 4-1.

After the implementation of the handshake communications, the domain managing entity 4 records the received entity ID information piece id4-1 into a domain member list ML4 (not shown) in the domain information recording section 4a. Thereby, the domain managing entity 4 registers the domain member entity 4-1 with the domain D4 while updating the domain member list ML4. Then, the domain managing entity 4 sends the domain member list ML4 to the domain managing entity 1 corresponding to the domain ID information piece Did1 in the registered domain list DL4. Sending the domain member list ML4 may be replaced with sending all the registered ID information pieces in the list ML4 or the newly registered ID information piece (pieces) therein. The domain managing entity 1 receives the domain member list ML4.

Upon the reception of the domain member list ML4, the domain managing entity 1 records the list ML4 into the domain information recording section 1a in such a manner as to relate the list ML4 with the domain ID information piece Did4 in the domain member list ML1.

To register the domain member entity 5-1 with the domain D5, the domain managing entity 5 records the domain ID information pieces Did1, Did2, and Did3, which have been sent from the domain managing entity 3, into a registered domain list DL5 in the domain information recording section 5a. Thus, the registered domain list DL5 is updated. Since the domain ID information pieces Did1, Did2, and Did3 are in the registered domain list DL5, the domains D1, D2, and D3 are defined as ones higher in rank than the domain D5. Thereafter, the domain managing entity 5 sends the related domain ID information piece Did5 and the domain ID information pieces Did1, Did2, and Did3 to the domain member entity 5. The domain member entity 5 receives the domain ID information pieces Did1, Did2, Did3, and Did5.

Upon the reception of the domain ID information pieces Did1, Did2, Did3, and Did5, the domain member entity 5-1 sends the entity ID information piece id5-1 to the domain managing entity 5. The domain managing entity 5 receives the entity ID information piece id5-1. In this way, handshake communications are implemented between the domain managing entity 5 and the domain member entity 5-1.

After the implementation of the handshake communications, the domain managing entity 5 records the received entity ID information piece id5-1 into a domain member list ML5 in the domain information recording section 5a. Thereby, the domain managing entity 5 registers the domain member entity 5-1 with the domain D5 while updating the domain member list ML5. Then, the domain managing entity 5 sends the domain member list ML5 to the domain managing entities 1, 2, and 3 corresponding to the domain ID information pieces Did1, Did2, and Did3 in the registered domain list DL5. Sending the domain member list ML5 may be replaced with sending all the registered ID information pieces in the list ML5 or the newly registered ID information piece (pieces) therein. The domain managing entities 1, 2, and 3 receive the domain member list ML5.

Upon the reception of the domain member list ML5, the domain managing entity 3 records the list ML5 into the domain information recording section 3a in such a manner as to relate the list ML5 with the domain ID information piece Did5 in the domain member list ML3.

Upon the reception of the domain member list ML5, the domain managing entity 2 records the list ML5 into the domain information recording section 2a in such a manner as to relate the list ML5 with the domain ID information piece Did5 in the domain member list ML2 (not shown).

Upon the reception of the domain member list ML5, the domain managing entity 1 records the list ML5 into the domain information recording section 1a in such a manner as to relate the list ML5 with the domain ID information piece Did5 in the domain member list ML3.

As the domains D1, D2, D3, D4, and D5 are hierarchized, the domain managing entities 1, 2, 3, 4, and 5 and the domain member entities 1-1, 1-2, 3-1, 3-2, 4-1, and 5-1 are hierarchized accordingly. During the previously-mentioned registering and hierarchizing procedures, a domain ID information piece is sent from a higher domain managing entity to a lower domain managing entity or a domain member entity before a domain ID information piece, an entity ID information piece, or a domain member list is sent to the higher domain managing entity. During the registering and hierarchizing procedures, the order of sending the ID information pieces and list may be reverse to the above-indicated one. Specifically, the registering procedures may start from a step of sending an entity or domain ID information piece from a lower entity to a higher entity. According to an example of this case, the domain D5 is registered with the domain D3 before the domain D3 is registered with the domain D1. In this case, when the domain D5 is registered with the domain D3, the registered domain list DL3 is updated. Then, the domain managing entity 3 sends the registered domain list DL3 to the domain managing entity 5. Sending the registered domain list DL3 may be replaced with sending all the registered ID information pieces in the list DL3 or the newly registered ID information piece (pieces) therein. Thereafter, the registered domain list DL5 is updated.

Figure 14:
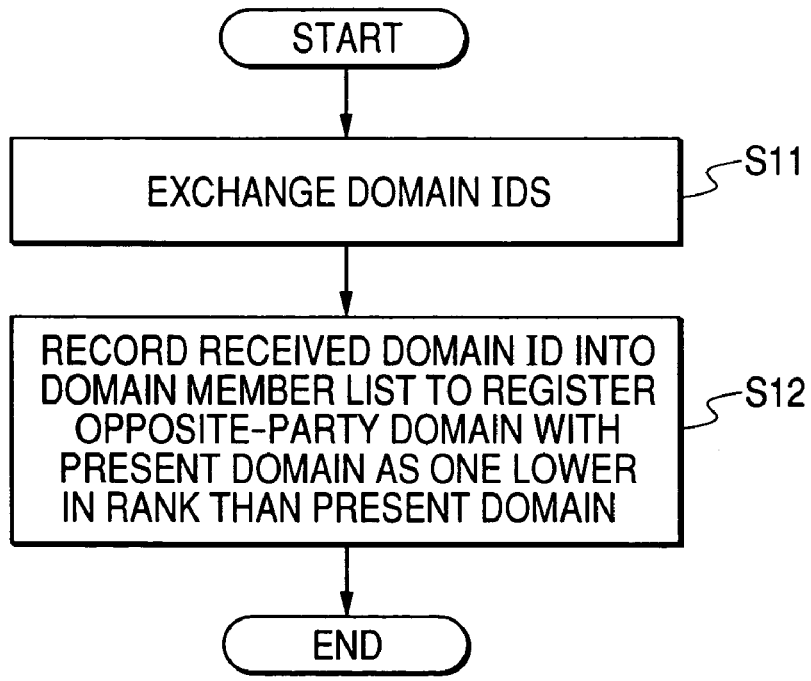
FIG. 14 is a flowchart of a first segment of a control program for a computer in each of domain managing entities in FIGS. 3 and 4.

FIG. 14 is a flowchart of a first segment of the control program for the computer in each of the domain managing entities 1, 2, 3, 4, and 5. The program segment in FIG. 14 is started when the present domain managing entity is requested to register a domain managed by another domain managing entity with a domain managed by the present domain managing entity as one lower in rank than the latter domain.

As shown in FIG. 14, a first step S11 of the program segment communicates with an opposite-party domain managing entity to exchange domain ID information pieces for domains managed by the present domain managing entity and the opposite-party domain managing entity.

A step S12 following the step S11 records the received domain ID information piece for the domain managed by the opposite-party domain managing entity into a domain member list in the domain information recording section in the present domain managing entity. Thereby, the domain managed by the opposite-party domain managing entity is registered with the domain managed by the present domain managing entity as one lower in rank than the latter domain. After the step S12, the current execution cycle of the program segment ends.

Figure 15:
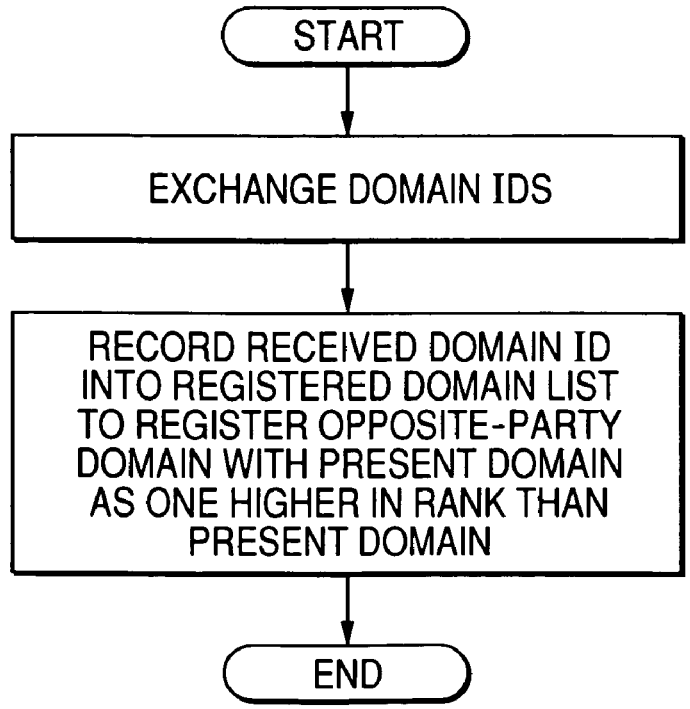
FIG. 15 is a flowchart of a second segment of the control program for the computer in each of the domain managing entities in FIGS. 3 and 4.

FIG. 15 is a flowchart of a second segment of the control program for the computer in each of the domain managing entities 1, 2, 3, 4, and 5. The program segment in FIG. 15 is started when the present domain managing entity is requested to register a domain managed by another domain managing entity with a domain managed by the present domain managing entity as one higher in rank than the latter domain.

As shown in FIG. 15, a first step S21 of the program segment communicates with an opposite-party domain managing entity to exchange domain ID information pieces for domains managed by the present domain managing entity and the opposite-party domain managing entity.

A step S22 following the step S21 records the received domain ID information piece for the domain managed by the opposite-party domain managing entity into a registered domain list in the domain information recording section in the present domain managing entity. Thereby, the domain managed by the opposite-party domain managing entity is registered with the domain managed by the present domain managing entity as one higher in rank than the latter domain. After the step S22, the current execution cycle of the program segment ends.

Figure 16:
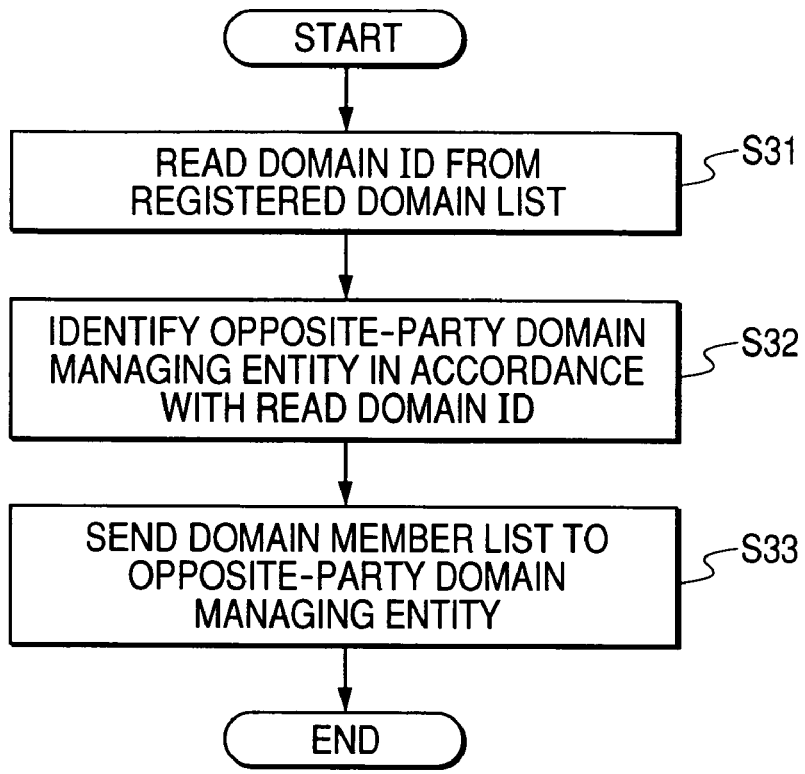
FIG. 16 is a flowchart of a third segment of the control program for the computer in each of the domain managing entities in FIGS. 3 and 4.

FIG. 16 is a flowchart of a third segment of the control program for the computer in each of the domain managing entities 1, 2, 3, 4, and 5. The program segment in FIG. 16 is started when the present domain managing entity is requested to send its domain member list to another domain managing entity managing a domain higher in rank than a domain managed by the present domain managing entity.

As shown in FIG. 16, a first step S31 of the program segment reads a domain ID information piece from a registered domain list in the domain information recording section in the present domain managing entity.

A step S32 following the step S31 identifies an opposite-party domain managing entity in accordance with the read domain ID information piece.

A step S33 subsequent to the step S32 sends a domain member list from the domain information recording section in the present domain managing entity to the opposite-party domain managing entity. After the step S33, the current execution cycle of the program segment ends.

Figure 17:
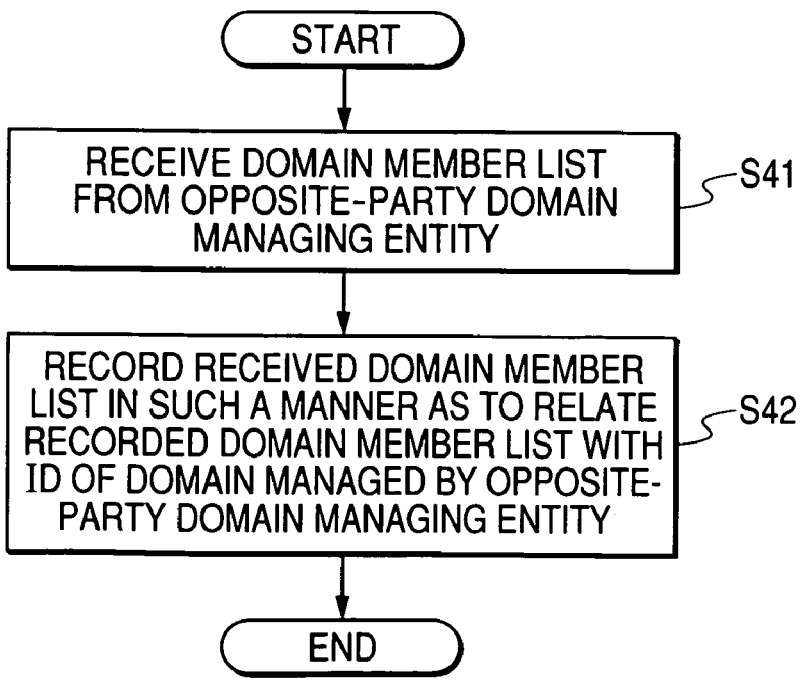
FIG. 17 is a flowchart of a fourth segment of the control program for the computer in each of the domain managing entities in FIGS. 3 and 4.

FIG. 17 is a flowchart of a fourth segment of the control program for the computer in each of the domain managing entities 1, 2, 3, 4, and 5. The program segment in FIG. 17 is started when the present domain managing entity is requested to receive a domain member list from another domain managing entity managing a domain lower in rank than a domain managed by the present domain managing entity.

As shown in FIG. 17, a first step S41 of the program segment receives a domain member list from an opposite-party domain managing entity.

A step S42 following the step S41 records the received domain member list into the domain information recording section in the present domain managing entity in such a manner as to relate the recorded domain member list with a domain ID information piece for a domain managed by the opposite-party domain managing entity which is in another domain member list in the domain information recording section in the present domain managing entity. After the step S42, the current execution cycle of the program segment ends.

THIRD EMBODIMENT

A third embodiment of this invention is similar to the second embodiment thereof except for design changes mentioned hereafter.

A description will now be given of the case where the domain D5 is already registered with the domains D1, D2, and D3 as one lower in rank than the domains D1, D2, and D3, and the domain member entity 5-1 is requested to be newly registered with the domain D5. As previously mentioned, the domains D1, D2, and D3 are managed by the domain managing entities 1, 2, and 3, respectively. The domain D5 is managed by the domain managing entity 5.

The domain managing entity 5 inquires of each of the domain managing entities 1, 2, and 3 whether the registration of the domain member entity 5-1 with the domain D5 should be permitted or forbidden. In response to the inquiry, each of the domain managing entities 1, 2, and 3 compares the current number of entity ID information pieces in the related domain member list ML1, ML2, or ML3 with a predetermined maximum number (a predetermined limit number). The maximum numbers of entity ID information pieces in the domain member lists ML1, ML2, and ML3 may be different from each other. When the current number of entity ID information pieces in the domain member list ML1, ML2, or ML3 is smaller than the maximum number, each of the domain managing entities 1, 2, and 3 answers the domain managing entity 5 that the registration should be permitted. Otherwise, each of the domain managing entities 1, 2, and 3 answers the domain managing entity 5 that the registration should be forbidden. In the case where all the answers from the domain managing entities 1, 2, and 3 indicate that the registration should be permitted, the domain managing entity 5 registers the domain member entity 5-1 with the domain D5. In the other cases, the domain managing entity 5 does not register the domain member entity 5-1 with the domain D5.

Figure 5:
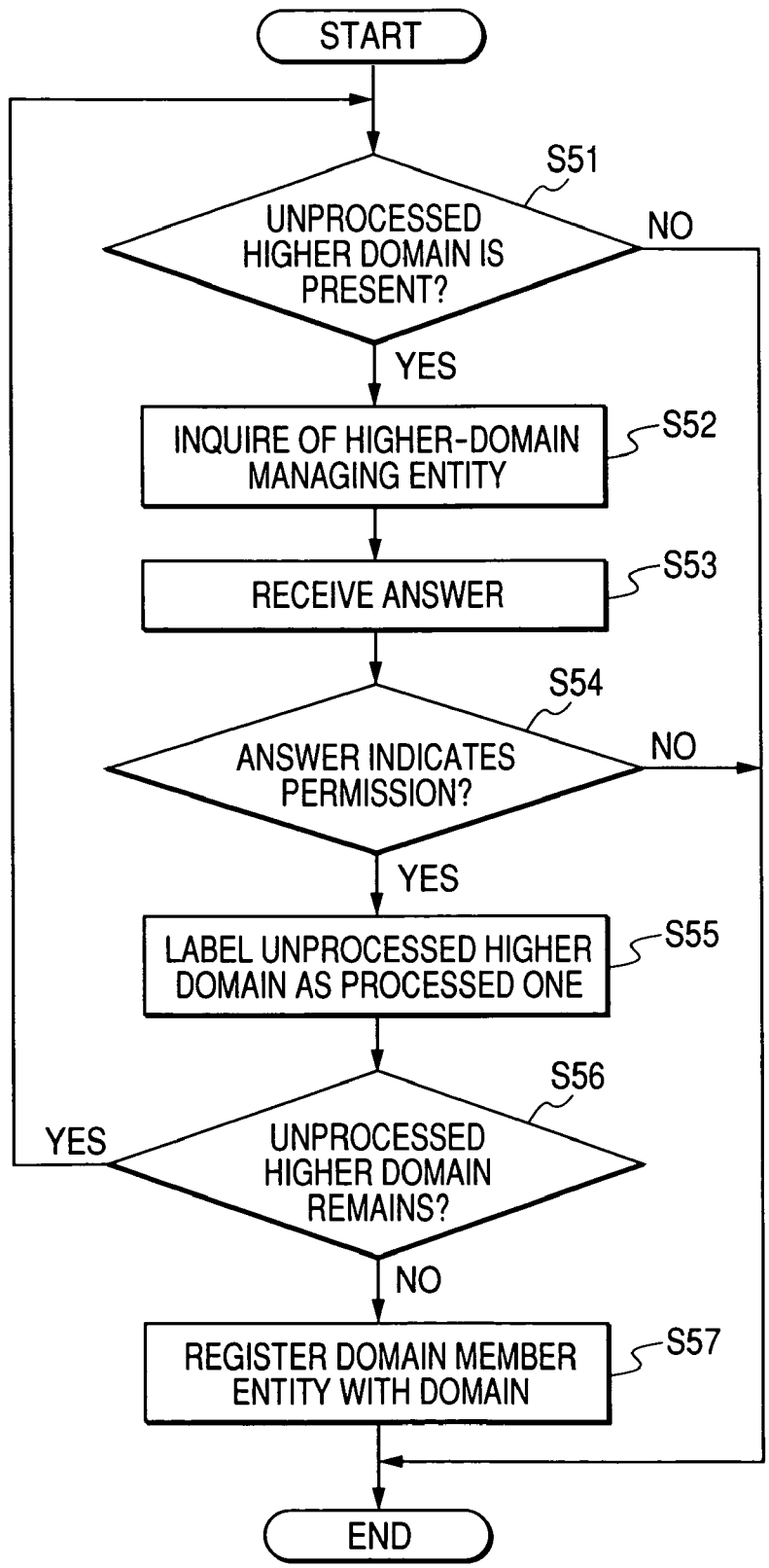
FIG. 5 is a flowchart of a first segment of a control program for a computer in each of domain managing entities in a third embodiment of this invention.

FIG. 5 is a flowchart of a first segment of a control program for a computer in each of the domain managing entities 1, 2, 3, 4, and 5. As shown in FIG. 5, a first step S51 of the program segment decides whether or not there is at least one before-processed domain higher in rank than the related domain (the present domain managed by the present domain managing entity). In the absence of a before-processed higher domain, the program exits from the step S51 and then the current execution cycle of the program segment ends. When there is only one before-processed higher domain, the step S51 labels it as an object higher domain. Then, the program advances from the step S51 to a step S52. When there are two or more before-processed higher domains, the step S51 selects one from them and labels the selected one as an object higher domain. Then, the program advances from the step S51 to the step S52.

The step S52 inquires of the domain managing entity for the object higher domain whether the registration of a domain member entity in question with the related domain should be permitted or forbidden.

A step S53 following the step S52 receives an answer from the domain managing entity for the object higher domain.

A step S54 subsequent to the step S53 decides whether or not the received answer indicates permission for the registration. When the received answer indicates permission for the registration, the program advances from the step S54 to a step S55. Otherwise, the program exits from the step S54, and then the current execution cycle of the program segment ends.

The step S55 labels the object higher domain as an after-processed higher domain.

A step S56 following the step S55 decides whether or not at least one before-processed higher domain remains. When at least one before-processed higher domain remains, the program returns from the step S56 to the step S51. Otherwise, the program advances from the step S56 to a step S57.

The step S57 registers the domain member entity in question with the related domain. After the step S57, the current execution cycle of the program segment ends.

Figure 6:
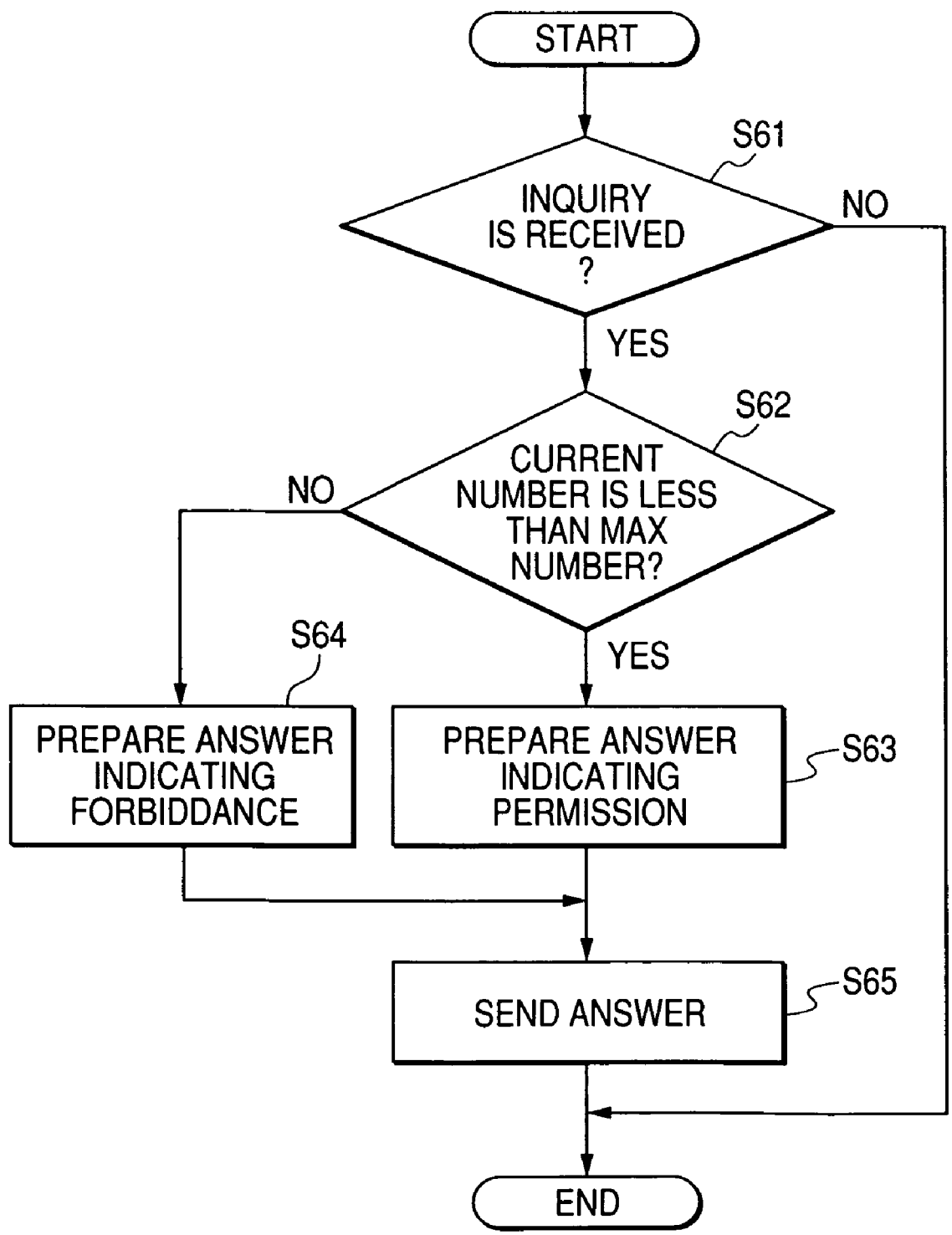
FIG. 6 is a flowchart of a second segment of the control program for the computer in each of the domain managing entities in the third embodiment of this invention.

FIG. 6 is a flowchart of a second segment of the control program for the computer in each of the domain managing entities 1, 2, 3, 4, and 5. As shown in FIG. 6, a first step S61 of the program segment decides whether or not an inquiry is received from a domain managing entity (for example, the domain managing entity 5). The inquiry is about, for example, whether the registration of the domain member entity 5-1 with the domain D5 should be permitted or forbidden. When the inquiry is received, the program advances from the step S61 to a step S62. Otherwise, the program exits from the step S61, and then the current execution cycle of the program segment ends.

The step S62 compares the current number of entity ID information pieces in the related domain member list with a predetermined maximum number (a predetermined limit number). When the current number of entity ID information pieces in the domain member list is smaller than the maximum number, the program advances from the step S62 to a step S63. Otherwise, the program advances from the step S62 to a step S64.

The step S63 prepares an answer indicating permission for the registration. After the step S63, the program advances to a step S65.

The step S64 prepares an answer indicating forbiddance of the registration. After the step S64, the program advances to the step S65.

The step S65 sends the answer to the domain managing member from which the inquiry comes. After the step S65, the current execution cycle of the program segment ends.

FOURTH EMBODIMENT

A fourth embodiment of this invention is similar to the second or third embodiment thereof except for design changes mentioned hereafter.

A domain managing system in the fourth embodiment of this invention forbids a domain member entity from being registered with a domain again in a specified time after the domain member entity has been withdrawn from the domain. The specified time is equal to a minimum domain-member updating interval set for the domain. In the case where the number of entity ID information pieces in a domain member list in each domain managing entity is limited to a predetermined maximum number, the domain managing system prevents a domain member entity from being repetitively registered with and withdrawn from a domain to unjustly evade this limitation and illegally use the domain.

It is assumed that the domains D1 and D2 are higher in rank than the domain D3, and that the domain member entity 3-1 is withdrawn from the domain D3 and is then requested to be registered therewith again. The domain member entity 3-1 is registered with the domain D3 while being also registered with the domains D1 and D2 as a domain member. During the registration of the domain member entity 3-1 with the domains D1 and D2, the domain managing entity 3 communicates with the domain managing entities 1 and 2 to obtain information representative of minimum domain-member updating intervals set for the domains D1 and D2. The domain managing entity 3 compares the minimum domain-member updating intervals set for the domains D1 and D2 with that set for the domain D3. When the minimum domain-member updating intervals set for the domains D1 and D2 are longer than that set for the domain D3, the domain managing entity 3 communicates with the domain managing entities 1 and 2 to equalize the minimum domain-member updating intervals set for the domains D1 and D2 to that set for the domain D3. On the other hand, when the minimum domain-member updating intervals set for the domains D1 and D2 are equal to or shorter than that set for the domain D3, the minimum domain-member updating intervals set for the domains D1 and D2 remain as they are. Thereby, the domains D1, D2, and D3 are managed in accordance with the minimum domain-member updating intervals set therefor.

Figure 7:
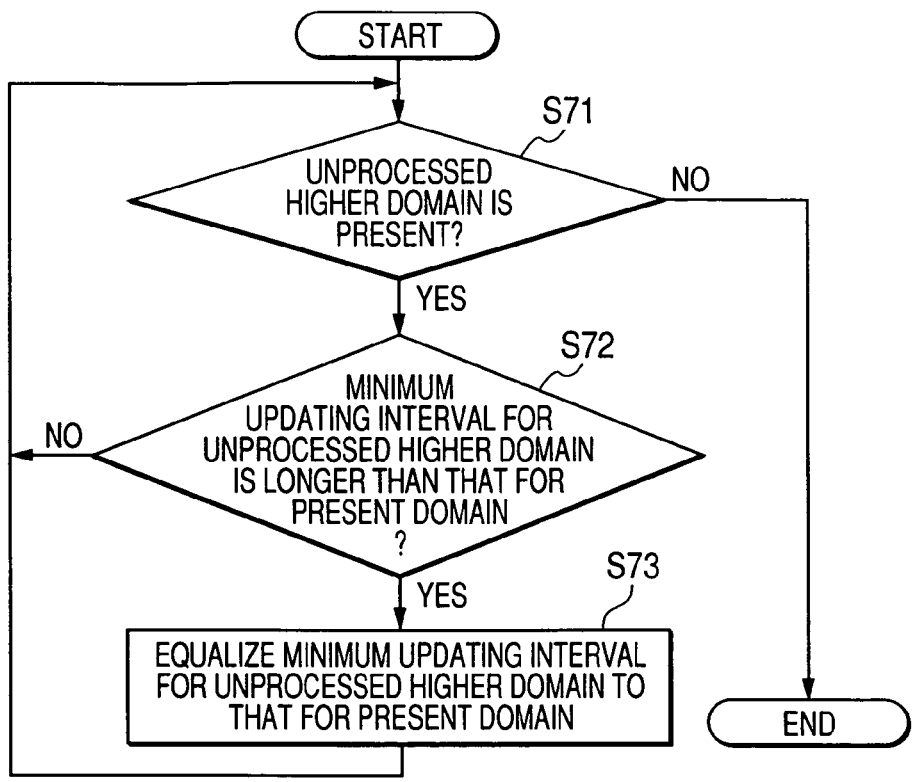
FIG. 7 is a flowchart of a segment of a control program for a computer in each of domain managing entities in a fourth embodiment of this invention.

FIG. 7 is a flowchart of a segment of a control program for a computer in each of the domain managing entities 1, 2, 3, 4, and 5. As shown in FIG. 7, a first step S71 of the program segment decides whether or not there is at least one before-processed domain higher in rank than the related domain (the present domain managed by the present domain managing entity). In the absence of a before-processed higher domain, the program exits from the step S71 and then the current execution cycle of the program segment ends. When there is only one before-processed higher domain, the step S71 labels it as an object higher domain. Then, the program advances from the step S71 to a step S72. When there are two or more before-processed higher domains, the step S71 selects one from them and labels the selected one as an object higher domain. Then, the program advances from the step S71 to the step S72.

The step S72 communicates with the domain managing entity for the object higher domain to obtain information representative of a minimum domain-member updating interval set for the object higher domain. The step S72 compares the minimum domain-member updating interval set for the object higher domain with that set for the related domain. When the minimum domain-member updating interval set for the object higher domain is longer than that set for the related domain, the program advances from the step S72 to a step S73. Otherwise, the program returns from the step S72 to the step S71.

The step S73 communicates with the domain managing entity for the object higher domain to equalize the minimum domain-member updating interval set for the object higher domain to that set for the related domain. The step S73 labels the object higher domain as an after-processed higher domain. After the step S73, the program returns to the step S71.

FIFTH EMBODIMENT

A fifth embodiment of this invention is similar to the second embodiment thereof except for design changes mentioned hereafter.

According to the fifth embodiment of this invention, each domain managing entity sets an allowable network response time for signal transfer from a domain member entity in the related domain to the domain managing entity. Each domain managing entity forbids a domain member entity, which is connected to the domain managing entity by a network causing a response time longer than the related allowable network response time, from being registered with the domain managed by the domain managing entity. In this way, a limitation is imposed on a network response time. Thereby, it is possible to implement geographically-restricted domain setting such that when a remote domain member entity is connected to a domain managing entity via a network (for example, the Internet), the remote domain member entity is prevented from becoming a member of the domain managed by the domain managing entity.

The domain member entity 5-1 is registered with the domain D5. The domain managing entity 5 manages the domain D5. The domain managing entity 5 sets an allowable network response time for signal transfer from the domain member entity 5-1 to the domain managing entity 5. Similarly, the domain managing entity 3, which manages the domain D3, sets an allowable network response time. In the case where the allowable network response time set by the domain managing entity 5 is longer than that set by the domain managing entity 3, the domain D5 is forbidden from being registered with the domain D3.

The allowable network response times are set for the domains, respectively. During the registration of a lower domain with a higher domain, the lower-domain managing entity communicates with the higher-domain managing entity to obtain information representative of the allowable network response time set by the higher-domain managing entity. The lower-domain managing entity compares the allowable network response time set by the higher-domain managing entity with that set by the lower-domain managing entity. When the allowable network response time set by the higher-domain managing entity is shorter than that set by the lower-domain managing entity, the lower-domain managing entity equalizes the allowable network response time set by the lower-domain managing entity to that set by the higher-domain managing entity. Thereby, the domains are managed in accordance with the severest conditions of the allowable network response times.

Figure 8:
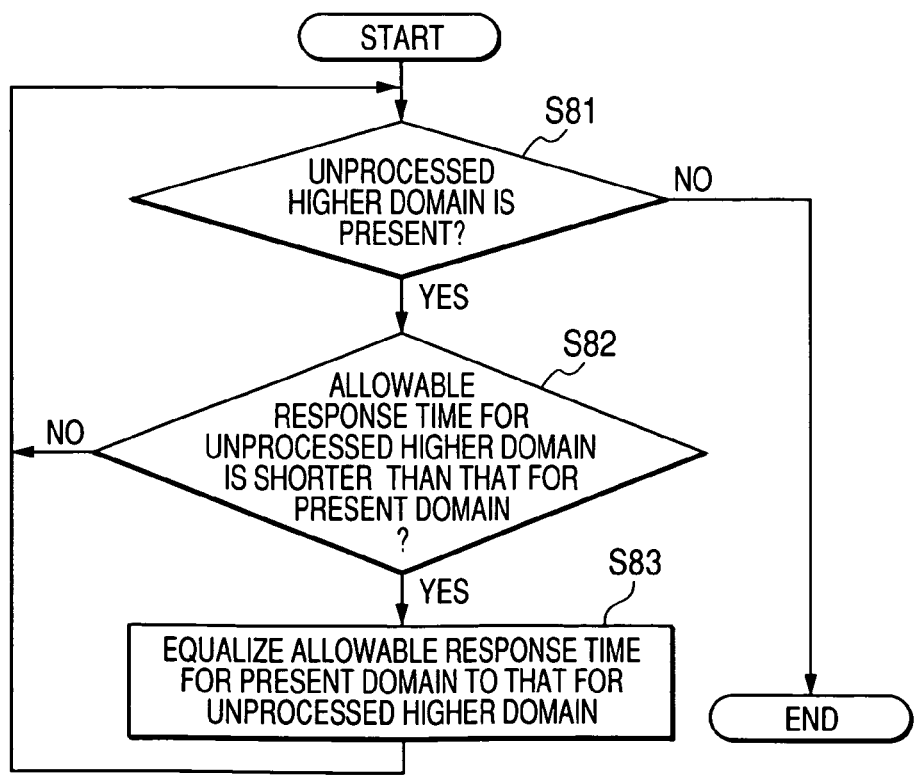
FIG. 8 is a flowchart of a segment of a control program for a computer in each of domain managing entities in a fifth embodiment of this invention.

FIG. 8 is a flowchart of a segment of a control program for a computer in each of the domain managing entities 1, 2, 3, 4, and 5. As shown in FIG. 8, a first step S81 of the program segment decides whether or not there is at least one before-processed domain higher in rank than the related domain (the present domain managed by the present domain managing entity). In the absence of a before-processed higher domain, the program exits from the step S81 and then the current execution cycle of the program segment ends. When there is only one before-processed higher domain, the step S81 labels it as an object higher domain. Then, the program advances from the step S81 to a step S82. When there are two or more before-processed higher domains, the step S81 selects one from them and labels the selected one as an object higher domain. Then, the program advances from the step S81 to the step S82.

The step S82 communicates with the domain managing entity for the object higher domain to obtain information representative of an allowable network response time set by the domain managing entity for the object higher domain. The S82 compares the allowable network response time set by the domain managing entity for the object higher domain with that set by the present domain managing entity. When the allowable network response time set by the domain managing entity for the object higher domain is shorter than that set by the present domain managing entity, the program advances from the step S82 to a step S83. Otherwise, the program returns from the step S82 to the step S81.

The step S83 equalizes the allowable network response time set by the present domain managing entity to that set by the domain managing entity for the object higher domain. The step S83 labels the object higher domain as an after-processed domain. After the step S83, the program returns to the step S81.

SIXTH EMBODIMENT

A sixth embodiment of this invention is similar to one of the first to fifth embodiments thereof except for design changes mentioned hereafter.

Figure 9:
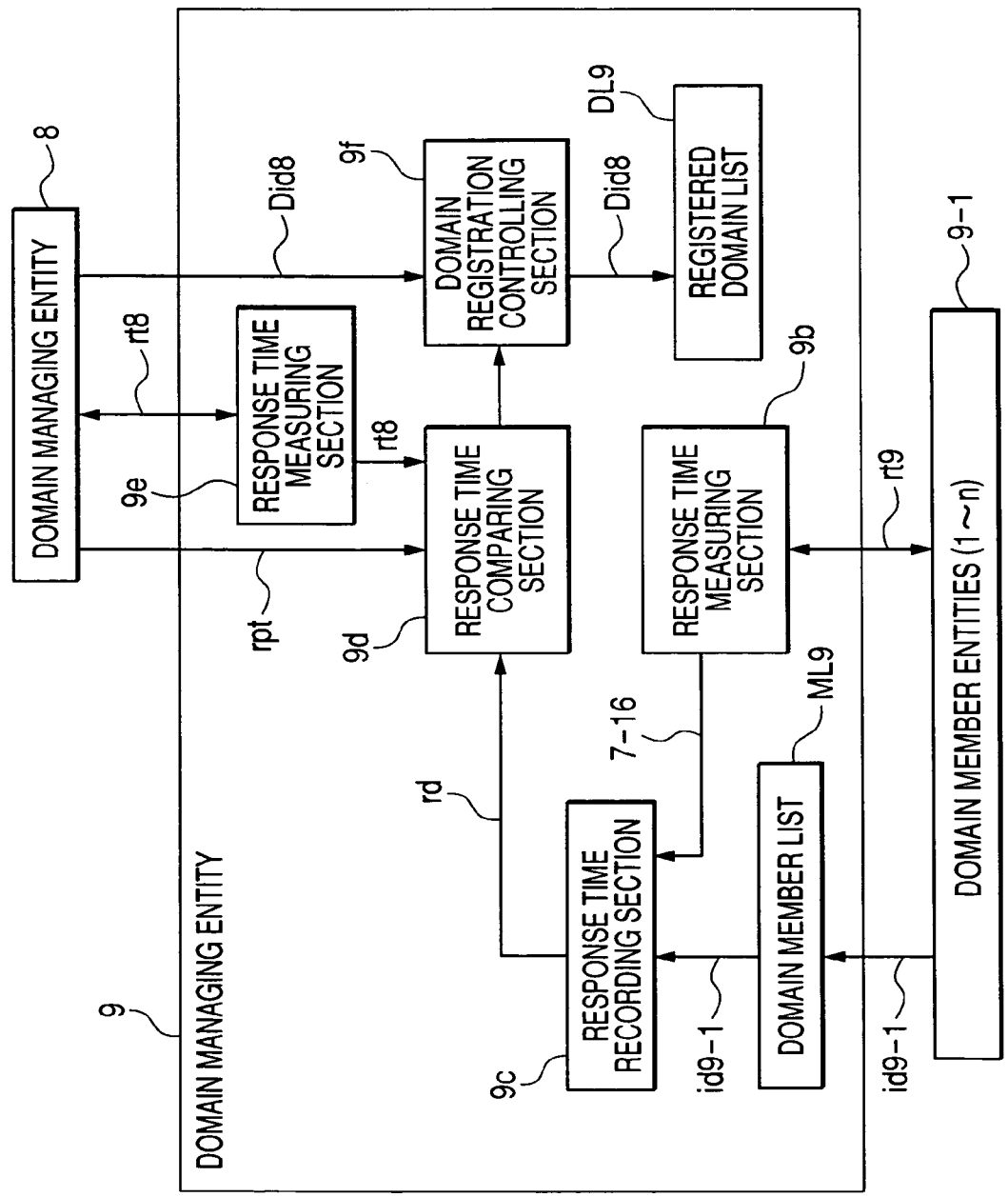
FIG. 9 is a diagram of domain managing entities and domain member entities in a domain managing system according to a sixth embodiment of this invention.

FIG. 9 shows domain managing entities 8 and 9, and "n" domain member entities 9-1 in a domain managing system according to the sixth embodiment of this invention, where "n" denotes a natural number. The domain managing entities 8 and 9 are designed to manage domains D8 and D9, respectively. The domain managing entities 8 and 9 are similar in internal design.

The domain managing entity 9 includes response time measuring sections 9b and 9e, a response time recording section 9c, a response time comparing section 9d, a domain registration controlling section 9f, a domain member list ML9, and a registered domain list DL9 which are implemented by, for example, a computer.

When registering the "n" domain member entities 9-1 with the domain D9, the domain managing entity 9 records the entity ID information pieces id9-1 for the "n" domain member entities 9-1 into the domain member list ML9. In addition, the response time measuring section 9b in the domain managing entity 9 measures network response times rt9 for signal transfer between the domain managing entity 9 and the "n"

domain member entities 9-1. Information representative of the measured network response times rt9 is stored in the response time recording section 9c in such a manner as to relate the measured network response times rt9 with the entity ID information pieces id9-1.

When the domain D9 is requested to be registered with the domain D8, the domain managing entity 9 receives the domain ID information piece Did8 for the domain D8 and information representative of an allowable network response time "rpt" from the domain managing entity 8. The domain ID information piece Did8 is notified to the domain registration controlling section 9f. The allowable network response time "rpt" is notified to the response time comparing section 9d. The response time measuring section 9e in the domain managing entity 9 measures a network response time rt8 for signal transfer between the domain managing entities 8 and 9. The response time measuring section 9e notifies the measured network response time rt8 to the response time comparing section 9d. The response time recording section 9c notifies the recorded values "rd" of the network response times rt9 to the response time comparing section 9d. The response time comparing section 9d adds the network response time rt8 to the recorded values "rd" to obtain addition-result times. The response time comparing section 9d compares the addition-result times with the allowable network response time "rpt". The response time comparing section 9d notifies the result of the comparison to the domain registration controlling section 9f. When the comparison result indicates that at least one of the addition-result times is longer than the allowable network response time "rpt", the domain registration controlling section 9f forbids the domain D9 from being registered with the domain D8. On the other hand, when the comparison result indicates that all the addition-result times are equal to or shorter than the allowable network response time "rpt", the domain registration controlling section 9f records the domain ID information piece Did8 for the domain D8 into the registered domain list DL9. In addition, the domain managing entity 9 communicates with the domain managing entity 8 so that the domain managing entity will register the domain D9 with the domain D8.

Figure 10:
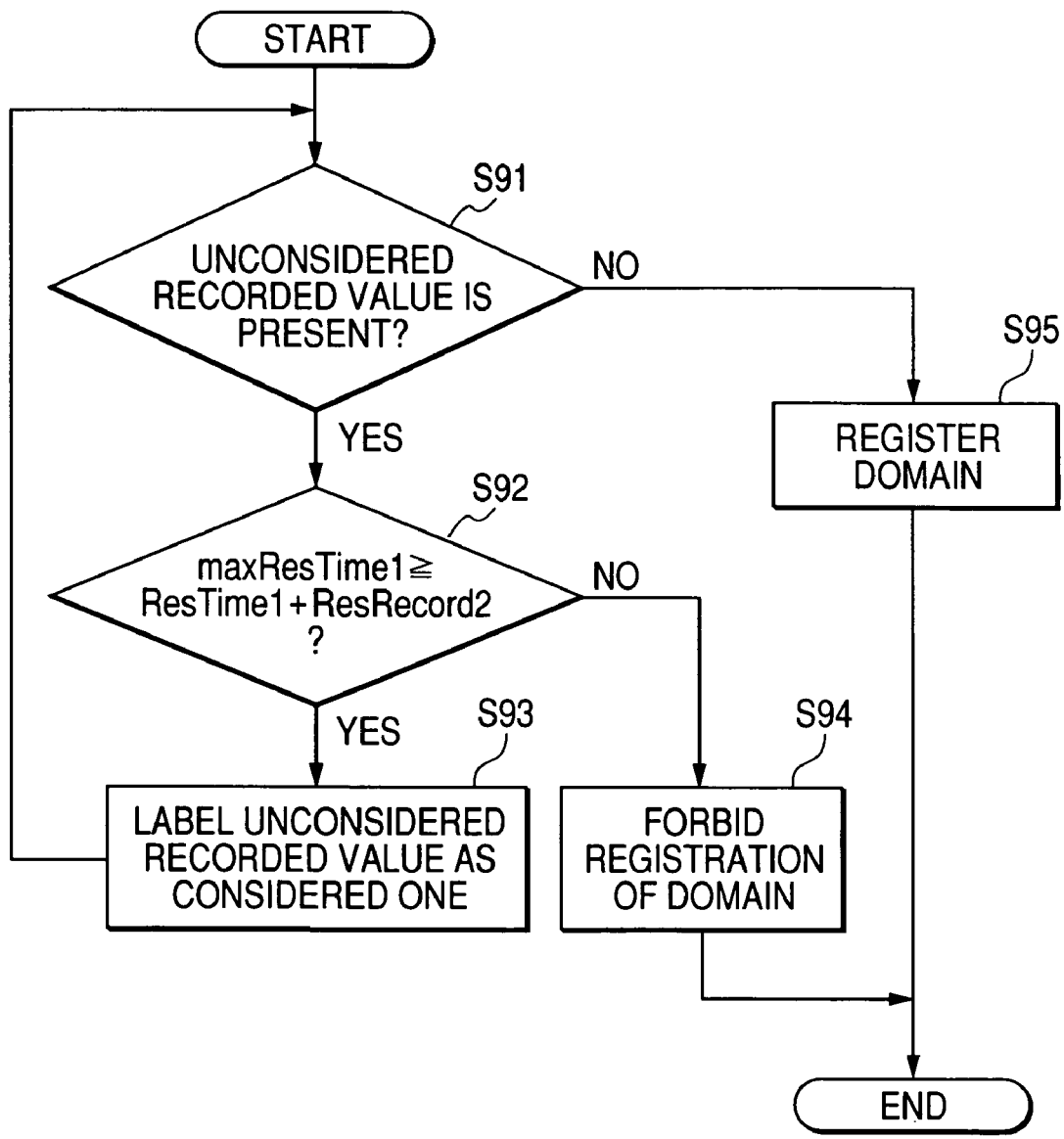
FIG. 10 is a flowchart of a segment of a control program for a computer in each of the domain managing entities in FIG. 9.

FIG. 10 is a flowchart of a segment of a control program for a computer in each of the domain managing entities 8 and 9. The program segment in FIG. 10 relates to a procedure of registering a domain with another domain.

As shown in FIG. 10, a first step S91 of the program segment decides whether or not at least one before-considered recorded value of a network response time (for example, at least one before-considered recorded value "rd" of a network response time rt9) is stored in the related response time recording section. In the absence of a before-considered recorded value, the program advances from the step S91 to a step S95. When only one before-considered recorded value is stored in the response time recording section, the step S91 labels it as an object recorded value ResRecord2. Then, the program advances from the step S91 to a step S92. When two or more before-considered recorded values are stored in the response time recording section, the step S91 selects one from them and labels the selected one as an object recorded value ResRecord2. Then, the program advances from the step S91 to the step S92.

The step S92 labels "maxResTime1" to an allowable network response time (for example, an allowable network response time "rpt") notified from the opposite-party domain managing entity. The step S92 labels "ResTime1" to a measured network response time for signal transfer between the present domain managing entity and a domain member entity in the domain managed by the present domain managing entity. The step S92 compares the sum of the network response time ResTime1 and the object recorded value ResRecord2 with the allowable network response time maxResTime1. When the sum of the network response time ResTime1 and the object recorded value ResRecord2 is equal to or shorter than the allowable network response time maxResTime1, the program advances from the step S92 to a step S93. Otherwise, the program advances from the step S92 to a step S94.

The step S93 labels the object recorded value as an after-considered recorded value in the response time recording section. After the step S93, the program returns to the step S91.

The step S94 forbids the domain managed by the present managing entity from being registered with the domain managed by the opposite-party domain managing entity. After the step S94, the current execution cycle of the program segment ends.

The step S95 communicates with the opposite-party domain managing entity to register the domain managed by the present domain managing entity with the domain managed by the opposite-party domain managing entity. After the step S95, the current execution cycle of the program segment ends.

SEVENTH EMBODIMENT

A seventh embodiment of this invention is similar to one of the first to fifth embodiments thereof except for design changes mentioned hereafter.

Figure 11:
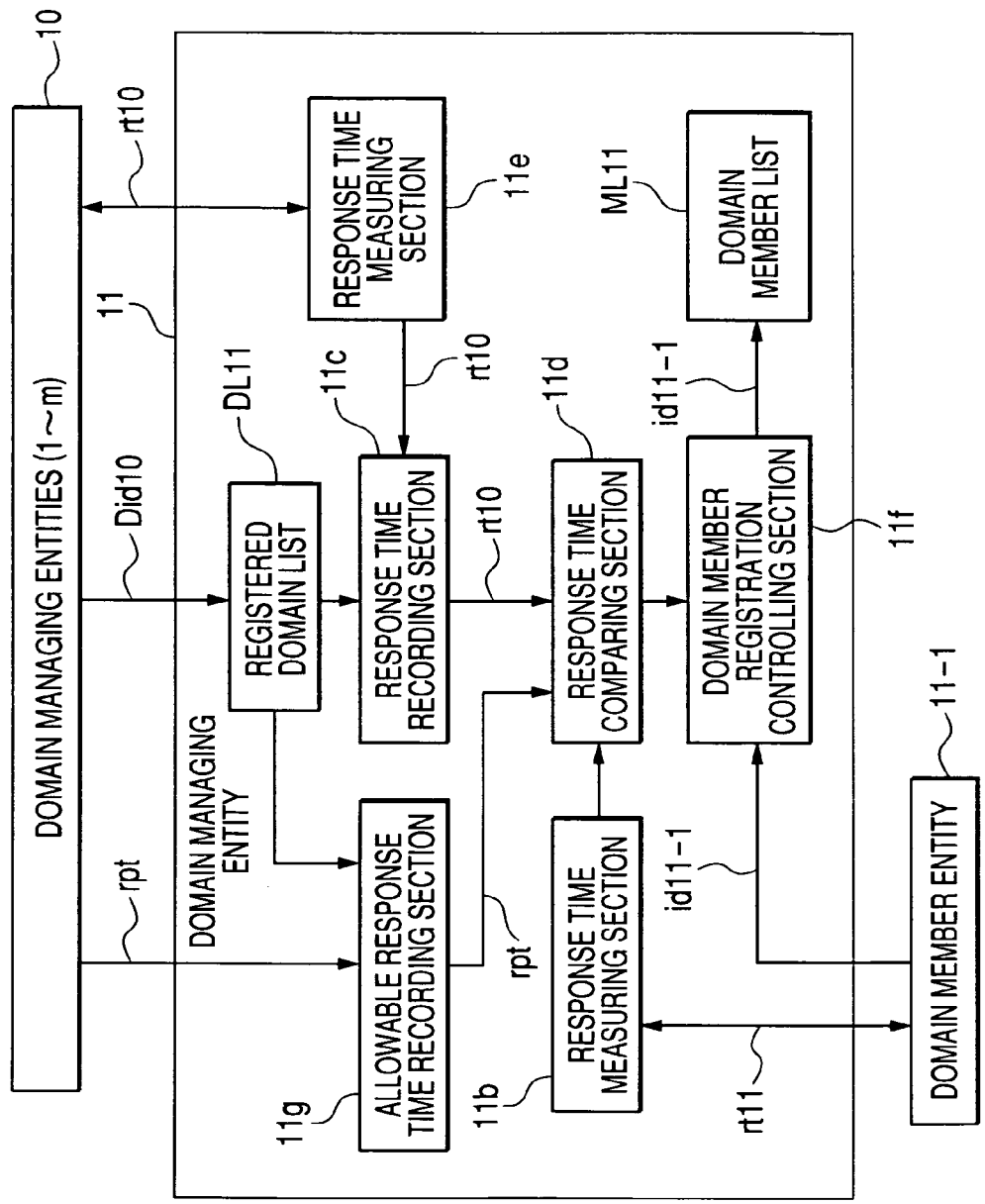
FIG. 11 is a diagram of domain managing entities and a domain member entity in a domain managing system according to a seventh embodiment of this invention.

FIG. 11 shows "m" domain managing entities 10, a domain managing entity 11, and a domain member entity 11-1 in a domain managing system according to the seventh embodiment of this invention, where "m" denotes a natural number. The "m" domain managing entities 10 are designed to manage "m" domains D10, respectively. The domain managing entity 11 is designed to manage a domain D11. The "m" domain managing entities 10 and the domain managing entity 11 are similar in internal design.

The domain managing entity 11 includes response time measuring sections 11b and 11e, a response time recording section 11c, a response time comparing section 11d, a domain member registration controlling section 11f, an allowable response time recording section 11g, a domain member list ML11, and a registered domain list DL11 which are implemented by, for example, a computer.

When the domain D11 is requested to be registered with the "m" domains D10, the domain managing entity 11 receives the domain ID information pieces Did10 for the "m" domains D10 and information representative of allowable network response times "rpt" from the "m" domain managing entities 10. The domain managing entity 11 records the received domain ID information pieces Did10 into the registered domain list DL11. The domain managing entity 11 records the received information representative of the allowable network response times "rpt" into the allowable response time recording section 11g in such a manner as to relate the allowable network response times "rpt" with the domain ID information pieces Did10. In addition, the response time measuring section 11e in the domain managing entity 11 measures network response times rt10 for signal transfer between the domain managing entity 11 and the "m" domain managing entities 10. Information representative of the measured network response times rt10 is stored in the response time recording section 11c in such a manner as to relate the measured network response times rt10 with the domain ID information pieces Did10.

When the domain member entity 11-1 is requested to be registered with the domain D11, the domain managing entity 11 receives the entity ID information piece id11-1 from the domain member entity 11-1. The entity ID information piece id11-1 is notified to the domain member registration controlling section 11f. In addition, the response time measuring section 11b in the domain managing entity 11 measures a network response time rt11 for signal transfer between the domain managing entity 11 and the domain member entity 11-1. The response time measuring section 11b notifies the measured network response time rt11 to the response time comparing section 11d. The response time recording section 11c notifies the network response times rt10 to the response time comparing section 11d. The response time recording section 11g notifies the allowable network response times "rpt" to the response time comparing section 11d. The response time comparing section 11d adds the network response time rt11 to the network response times rt10 to obtain addition-result times. The response time comparing section 11d compares the addition-result times with the allowable network response times "rpt", respectively. The response time comparing section 11d notifies the result of the comparison to the domain member registration controlling section 11f. When the comparison result indicates that at least one of the addition-result times is longer than the related allowable network response time "rpt", the domain member registration controlling section 11f forbids the entity ID information piece id11-1 from being recorded into the domain member list ML11. Thus, the domain member registration controlling section 11f forbids the domain member entity 11-1 from being registered with the domain D11. On the other hand, when the comparison result indicates that all the addition-result times are equal to or shorter than the respective allowable network response times "rpt", the domain member registration controlling section 11f records the entity ID information piece id11-1 into the domain member list ML11. Thus, the domain member registration controlling section 11f registers the domain member entity 11-1 with the domain D11.

Figure 12:
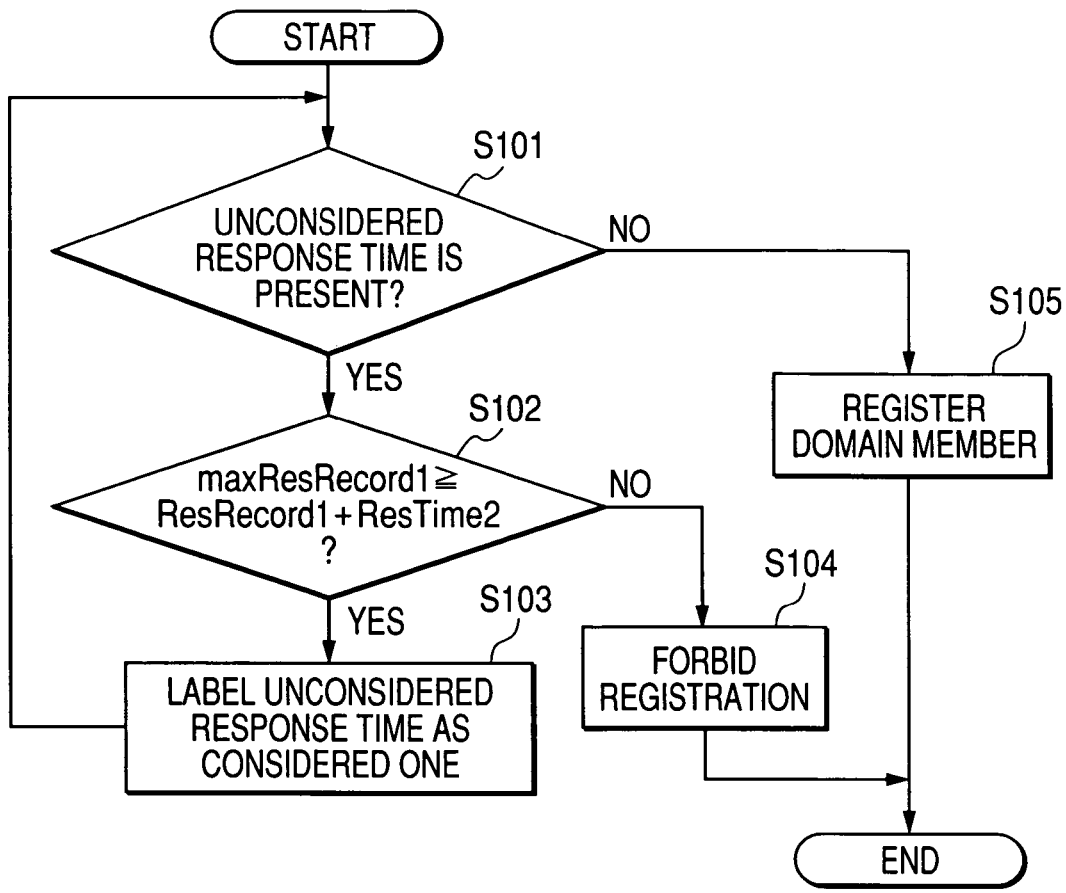
FIG. 12 is a flowchart of a segment of a control program for a computer in each of the domain managing entities in FIG. 11.

FIG. 12 is a flowchart of a segment of a control program for a computer in each of the "m" domain managing entities 10 and the domain managing entity 11. The program segment in FIG. 12 relates to a procedure of registering a domain member entity with the domain managed by the present domain managing entity.

As shown in FIG. 12, a first step S101 of the program segment decides whether or not at least one before-considered network response time (for example, at least one before-considered network response time rt10) is stored in the related response time recording section and at least one before-considered allowable response time (for example, at least one before-considered allowable response time "rpt") is stored in the related allowable response time recording section. In the absence of a before-considered network response time and a before-considered allowable response time, the program advances from the step S101 to a step S105. When only one before-considered network response time is stored in the response time recording section and only one before-considered allowable response time is stored in the allowable response time recording section, the step S101 labels them as object ones ResRecord1 and maxResRecord1 respectively. Then, the program advances from the step S101 to a step S102. When two or more before-considered network response times are stored in the response time recording section and two or more before-considered allowable response times are stored in the allowable response time recording section, the step S101 selects one from the before-considered network response times and one from the before-considered allowable response times and labels the selected ones as object ones ResRecord1 and maxResRecord1 respectively. Then, the program advances from the step S101 to the step S102.

The step S102 labels "Restime2" to a measured network response time (for example, the network response time rt11) for signal transfer between the present domain managing entity and a domain member entity requested to be registered with the domain managed by the present domain managing entity. The step S102 compares the sum of the object network response time ResRecord1 and the network response time Restime2 with the object allowable network response time maxResRecord1. When the sum of the object network response time ResRecord1 and the network response time Restime2 is equal to or shorter than the object allowable network response time maxResRecord1, the program advances from the step S102 to a step S103. Otherwise, the program advances from the step S102 to a step S104.

The step S103 labels the object network response time and the object allowable network response time as an after-considered network response time and an after-considered allowable network response time in the response time recording section and the related allowable response time recording section. After the step S103, the program returns to the step S101.

The step S104 forbids the domain member entity from being registered with the domain managed by the present managing entity. After the step S104, the current execution cycle of the program segment ends.

The step S105 registers the domain member entity with the domain managed by the present domain managing entity. After the step S105, the current execution cycle of the program segment ends.

EIGHTH EMBODIMENT

An eighth embodiment of this invention is similar to one of the first to seventh embodiments thereof except for design changes mentioned hereafter.

In the eighth embodiment of this invention, a first domain managing entity sends the domain ID information piece for a related domain to a domain member entity and a second domain managing entity. The first domain managing entity receives, from the domain member entity, the entity ID information piece for the domain member entity. The first domain managing entity receives, from the second domain managing entity, the domain ID information piece for the domain managed by the second domain managing entity.

In the eighth embodiment of this invention, a first domain managing entity, which manages a lower domain to be newly registered with a higher domain, sends a received domain ID information piece to a domain member entity in the lower domain. The domain member entity receives the domain ID information piece. The first domain managing entity receives, from the domain member entity, the entity ID information piece for the domain member entity. The first domain managing entity passes the received entity ID information piece to a second domain managing entity which manages the higher domain. The domain member entity and the first domain managing entity which receive the same domain ID information piece are registered with the higher domain.

Figure 13:
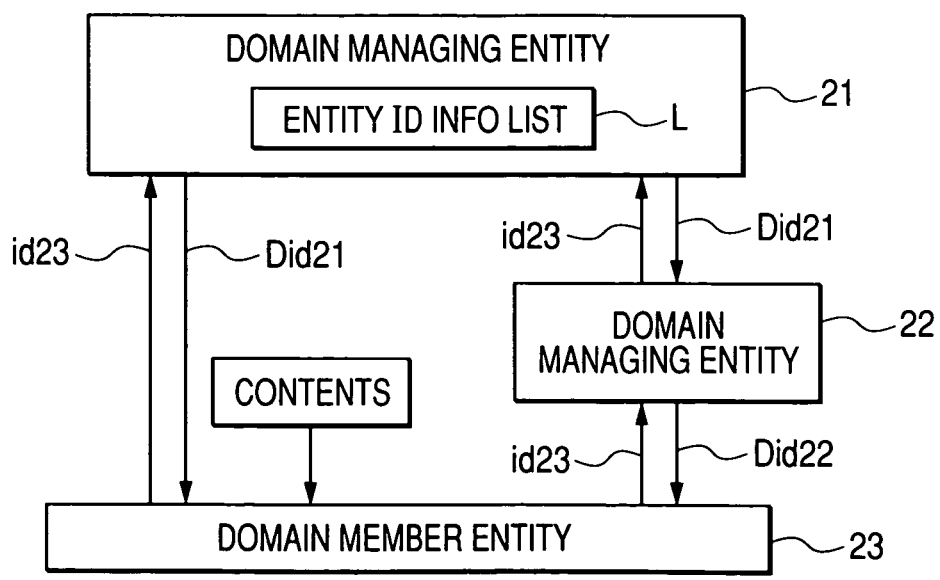
FIG. 13 is a diagram of a domain managing system according to an eighth embodiment of this invention.

FIG. 13 shows a domain managing system according to the eighth embodiment of this invention. The domain managing system of FIG. 13 includes domain managing entities 21 and 22, and a domain member entity 23.

Preferably, the domain managing entities 21 and 22 include domain managing devices having computers respectively. Similarly, the domain member entity 23 includes a domain member device having a computer. The computers operate in accordance with control programs (computer programs) installed thereon. The control programs are designed to enable the domain managing entities 21 and 22 and the domain member entity 23 to perform actions indicated hereafter.

The domain managing entities 21 and 22 serve to manage domains D21 and D22, respectively. Domain ID information pieces Did21 and Did22 are assigned to the domains D21 and D22, respectively. An entity ID information piece id23 is assigned to the domain member entity 23. The domain managing entity 21 has an entity ID information list L. It should be noted that the entity ID information list L may be a domain member list.

A description will now be given of the case where the domain member entity 23 is requested to be registered with the domain D22. The domain member entity 23 sends the entity ID information piece id23 to the domain managing entity 22. The domain managing entity 22 receives the entity ID information piece id23. The domain managing entity 22 sends the domain ID information piece Did22 to the domain member entity 23. The domain member entity 23 receives the domain ID information piece Did22.

The domain D22 is registered with the domain D21. In this case, the domain managing entity 22 sends the entity ID information piece id23 to the domain managing entity 21. The domain managing entity 21 receives the entity ID information piece id23. The domain managing entity 21 records the received entity ID information piece id23 in the entity ID information list L. Thus, the domain member entity 23 is registered with the domain D21. The domain managing entity 21 sends the domain ID information piece Did21 to the domain managing entity 22. The domain managing entity 22 receives the domain ID information piece Did21. Provided that the domain member entity 23 is in connection with the domain managing entity 22 at this time, the domain managing entity 22 passes the received domain ID information piece Did21 to the domain member entity 23. On the other hand, when the domain member entity 23 is out of connection with the domain managing entity 22, the domain managing entity 22 can not pass the received domain ID information piece Did21 to the domain member entity 23. Thus, in this case, the domain member entity 23 does not have the domain ID information piece Did21 although it has been registered with the domain D21.

When trying to access the body of a content (for example, a home movie, a motion picture, a television program, an audio visual stream, a music tune, or a computer game program) licensed to the domain D21, the domain member entity 23 is required to present the domain ID information piece Did21 for the domain D21. For example, the use of the body of the content is granted to members of the domain D21. If the domain member entity 23 does not have the domain ID information piece Did21, the access to the body of the content is thus rejected. In this case, the domain member entity 23 accesses a non-body part of the content and extracts the ID of the domain managing entity 21 therefrom. The domain member entity 23 detects the address or location of the domain managing entity 21 from its ID. Then, the domain member entity 23 contacts the domain managing entity 21 according to the detected address or location, and sends a request for the domain ID information piece Did21 to the domain managing entity 21. The request contains the entity ID information piece id23. The domain managing entity 21 receives the request. The request provides the confirmation that the domain member entity 23 is registered with the domain D21 as a member thereof.

Specifically, the domain managing entity 21 extracts the entity ID information piece id23 from the received request. The domain managing entity 21 checks whether or not the ID information piece same as the extracted entity ID information piece id23 is in the entity ID information list L. When the ID information piece same as the extracted entity ID information piece id23 is in the entity ID information list L, the domain managing entity 21 sends the domain ID information piece Did21 to the domain member entity 23. The domain member entity 23 receives the domain ID information piece Did21. The domain member entity 23 is allowed to access the body of the content through the use of the received domain ID information piece Did21. On the other hand, when the ID information piece same as the extracted entity ID information piece id23 is absent from the entity ID information list L, the domain managing entity 21 does not send the domain ID information piece Did21 to the domain member entity 23. In this case, the domain member entity 23 can not access the body of the content.

There is the content, the use of which is granted to members of the domain D21. It is assumed that the domain member entity 23 has not been registered with the domain D21 yet but has already been registered with another domain belonging to the domain D21 and managed by a domain managing entity other than the domain managing entity 21, and that the domain member entity 23 has not been informed of these conditions. In this case, when the domain member entity 23 tries to use the content, a check is made as to which of domains each having the domain member entity 23 as a member belongs to the domain D21. Specifically, each of the domain managing entities for these domains is inquired of whether or not the related domain belongs to the domain D21. It should be noted that in FIG. 13, there is the single domain D22 with which the domain member entity 23 has already been registered. In the case where an answer to the inquiry to a first domain shows that the first domain belongs to the domain 21, the inquiries to second and later domains are omitted.

The content, the use of which is granted to members of the domain D21, has a non-body part where the ID of the domain managing entity 21 is recorded. The ID of the domain managing entity 21 indicates the address or location thereof. When the domain member entity 23 tries to use the body of the content, the domain member entity 23 accesses the non-body part of the content and extracts the ID of the domain managing entity 21 therefrom. The domain member entity 23 detects the address or location of the domain managing entity 21 from its ID. Accordingly, it is easier to detect the address or location of the domain managing entity 21 than detecting the addresses or locations of other domain managing entities. Therefore, a smooth domain registering procedure can be implemented.

NINTH EMBODIMENT

A ninth embodiment of this invention is similar to one of the first to eighth embodiments thereof except that the domain managing entities are provided in a common processing apparatus.

TENTH EMBODIMENT

A tenth embodiment of this invention is similar to one of the first to eighth embodiments thereof except that the domain managing entities are provided by software modules connected on a software-based communicable basis.

ELEVENTH EMBODIMENT

An eleventh embodiment of this invention is similar to one of the fifth to seventh embodiments thereof except that access times are used instead of the network response times.

What is claimed is:

1. A method of registering domains, comprising the steps of:
sending a first domain ID information piece for a first domain from a first computer-controlled domain managing entity to a second computer-controlled domain managing entity, the first computer-controlled domain managing entity managing the first domain, the second computer-controlled domain managing entity managing a second domain;
sending a second domain ID information piece for the second domain from the second computer-controlled domain managing entity to the first computer-controlled domain managing entity;
registering the first domain with the second domain as a domain higher in rank than the second domain in response to the first domain ID information piece sent from the first computer-controlled domain managing entity to the second computer-controlled domain managing entity; and
registering the second domain with the first domain as a domain lower in rank than the first domain in response to the second domain ID information piece sent from the second computer-controlled domain managing entity to the first computer-controlled domain managing entity.

2. A method as recited in claim 1, further comprising the steps of:
sending the second domain ID information piece from the second computer-controlled domain managing entity to a domain member entity;
sending an entity ID information piece for the domain member entity from the domain member entity to the second computer-controlled domain managing entity;
registering the domain member entity with the second domain in response to the entity ID information piece sent from the domain member entity to the second computer-controlled domain managing entity;
sending the entity ID information piece from the second computer-controlled domain managing entity to the first computer-controlled domain managing entity; and
registering the domain member entity with the first domain in response to the entity ID information piece sent from the second computer-controlled domain managing entity to the first computer-controlled domain managing entity.

3. A method as recited in claim 1, wherein the step of registering the first domain with the second domain comprises recording the first domain ID information piece into a registered domain list so that the first domain will be higher in rank than the second domain, and the step of registering the second domain with the first domain comprises recording the second domain ID information piece into a domain member list so that the second domain will be lower in rank than the first domain.

4. A method as recited in claim 2, wherein the step of registering the first domain with the second domain comprises recording the first domain ID information piece into a registered domain list so that the first domain will be higher in rank than the second domain, the step of registering the second domain with the first domain comprises recording the second domain ID information piece into a first domain member list so that the second domain will be lower in rank than the first domain, the step of registering the domain member entity with the second domain comprises recording the entity ID information piece into a second domain member list, and the step of registering the domain member entity with the first domain comprises recording the entity ID information piece into the first domain member list while relating the entity ID information piece with the second domain ID information piece.

5. A method as recited in claim 4, further comprising the steps of:
detecting the number of entity ID information pieces in the second domain member list;
comparing the detected number with a predetermined maximum number to decide whether or not the detected number is less than the predetermined maximum number;
permitting registering the domain member entity with the second domain when it is decided that the detected number is less than the predetermined maximum number; and
forbidding registering the domain member entity with the second domain when it is decided that the detected number is not less than the predetermined maximum number.

6. A method of registering domains, comprising the steps of:
notifying an allowable response time from a first computer-controlled domain managing entity to a second computer-controlled domain managing entity, the first computer-controlled domain managing entity managing a first domain, the second computer-controlled domain managing entity managing a second domain lower in rank than the first domain, the second domain having a domain member entity as a registered member thereof, the second computer-controlled domain managing entity having information indicative of a first response time for signal transfer between the second computer-controlled domain managing entity and the domain member entity;
measuring a second response time for signal transfer between the first computer-controlled domain managing entity and the second computer-controlled domain managing entity;
comparing a sum of the first response time and the second response time with the allowable response time notified from the first computer-controlled domain managing entity to the second computer-controlled domain managing entity to decide whether or not the sum is greater than the allowable response time; and
forbidding registering the second domain with the first domain when it is decided that the sum is greater than the allowable response time.

7. A method of registering domains, comprising the steps of:
notifying an allowable response time from a first computer-controlled domain managing entity to a second computer-controlled domain managing entity, the first computer-controlled domain managing entity managing a first domain, the second computer-controlled domain managing entity managing a second domain lower in rank than the first domain, the second computer-controlled domain managing entity having information indicative of a first response time for signal transfer between the first computer-controlled domain managing entity and the second computer-controlled domain managing entity;

measuring a second response time for signal transfer between a domain member entity and the second computer-controlled domain managing entity;

comparing a sum of the first response time and the second response time with the allowable response time notified from the first computer-controlled domain managing entity to the second computer-controlled domain managing entity to decide whether or not the sum is greater than the allowable response time; and forbidding registering the domain member entity with the second domain when it is decided that the sum is greater than the allowable response time.

8. A method of registering domains, wherein a first computer-controlled domain managing entity manages a first domain through the use of a first domain ID information piece for the first domain, and a second computer-controlled domain managing entity manages a second domain through a second domain ID information piece for the second domain, and wherein a domain member entity assigned an entity ID information piece is registered with the second domain, and the second domain is registered with the first domain as one lower in rank than the first domain, the method comprising the steps of:

sending a request for a domain ID information piece from the domain member entity to the first computer-controlled domain managing entity in cases where the second computer-controlled domain managing entity does not notify the domain member entity that the second domain is registered with the first domain and one of a content or a service given a prescribed domain ID information piece is requested to be used by the domain member entity, the request containing the entity ID information piece for the domain member entity;

deciding whether or not the domain member entity is registered with the first domain on the basis of the entity ID information piece in the request sent from the domain member entity to the first computer-controlled domain managing entity;

sending the first domain ID information piece for the first domain from the first computer-controlled domain managing entity to the domain member entity when it is decided that the domain member entity is registered with the first domain;

comparing the first domain ID information piece sent from the first computer-controlled domain managing entity to the domain member entity with the prescribed domain ID information piece to decide whether or not the first domain ID information piece and the prescribed domain ID information piece are the same;

permitting the domain member entity to use said one of the content and the service when it is decided that the first domain ID information piece and the prescribed domain ID information piece are the same; and forbidding the domain member entity to use said one of the content and the service when it is decided that the first domain ID information piece and the prescribed domain ID information piece are not the same.

9. A system for registering domains, comprising:
a first domain assigned a first ID;
a first list for IDs of members registered with the first domain as ones lower in rank than the first domain;
a second list for IDs of domains registered with the first domain as ones higher in rank than the first domain;
a second domain assigned a second ID;
a third list for IDs of members registered with the second domain as ones lower in rank than the second domain;
a fourth list for IDs of domains registered with the second domain as ones higher in rank than the second domain;
means for recording the first ID into the fourth list to register the first domain with the second domain as one higher in rank than the second domain; and
means for recording the second ID into the first list to register the second domain with the first domain as one lower in rank than the first domain.

10. A system as recited in claim 9, further comprising:
a domain member entity assigned a third ID;
means for recording the third ID into the first list to register the domain member entity with the first domain; and
means for recording the third ID into the third list to register the domain member entity with the second domain.

11. A method as recited in claim 1, wherein the step of registering the first domain with the second domain comprises recording data representative of the first domain into a storage device related to the second domain.

12. A method as recited in claim 11, wherein the step of registering the second domain with the first domain comprises recording data representative of the second domain into a storage device related to the first domain.

13. A method as recited in claim 6, wherein the step of measuring comprises using a computer to measure said second response time.

14. A method as recited in claim 7, wherein the step of measuring comprises using a computer to measure said second response time.

15. A method as recited in claim 8, wherein the step of comparing comprises using a computer to compare the first domain ID information piece with the prescribed domain ID information piece.

* * * * *